US010027507B2

(12) United States Patent
Morioka

(10) Patent No.: US 10,027,507 B2
(45) Date of Patent: Jul. 17, 2018

(54) SETTING OF NETWORK ALLOCATION VECTORS IN A WIRELESS COMMUNICATION SYSTEM

(75) Inventor: Yuichi Morioka, Tokyo (JP)

(73) Assignee: SONY CORPORATION, Tokyo (JP)

( * ) Notice: Subject to any disclaimer, the term of this patent is extended or adjusted under 35 U.S.C. 154(b) by 1489 days.

(21) Appl. No.: 12/527,216

(22) PCT Filed: Feb. 29, 2008

(86) PCT No.: PCT/JP2008/054113
§ 371 (c)(1),
(2), (4) Date: Aug. 14, 2009

(87) PCT Pub. No.: WO2008/111496
PCT Pub. Date: Sep. 19, 2008

(65) Prior Publication Data
US 2010/0074198 A1  Mar. 25, 2010

(30) Foreign Application Priority Data

Mar. 5, 2007 (JP) ................................. 2007-053735
Jan. 8, 2008 (JP) ................................. 2008-000955

(51) Int. Cl.
H04L 12/413 (2006.01)
H04W 74/04 (2009.01)
(Continued)

(52) U.S. Cl.
CPC ........... *H04L 12/413* (2013.01); *H04W 74/04* (2013.01); *H04W 74/0816* (2013.01); *H04W 84/18* (2013.01)

(58) Field of Classification Search
CPC ................ H04L 12/413; H04W 74/04; H04W 74/0816; H04W 84/18
(Continued)

(56) References Cited

U.S. PATENT DOCUMENTS 7,046,650 B2 * 5/2006 Sherman ........... H04W 74/0808
370/310
2003/0133469 A1 * 7/2003 Brockmann et al. ......... 370/445
(Continued)

FOREIGN PATENT DOCUMENTS

JP 2004-191819 7/2004
JP 2004-363993 12/2004
(Continued)

Primary Examiner — Luat Phung
Assistant Examiner — Saad A Waqas
(74) Attorney, Agent, or Firm — Paratus Law Group, PLLC

(57) ABSTRACT

In a wireless communication system where packet transmission begins after a preparation process is performed between a source and a destination, the source stores, in a header of a preparation packet, first duration information corresponding to an end of a first response packet sent from the destination and second duration information corresponding to an end of a second response packet sent from the destination. A neighboring station having received the preparation packet sets a first NAV relating to a scheduled reception completion time of the first response packet based on the first duration information and a second NAV relating to a scheduled reception completion time of the second response packet based on the second duration information and ignores the second NAV when no packet transmission is detected within the first NAV period or within a predetermined time after the scheduled reception completion time of the first response packet.

5 Claims, 12 Drawing Sheets

(51) Int. Cl.
*H04W 74/08* (2009.01)
*H04W 84/18* (2009.01)

(58) Field of Classification Search
USPC .......................................... 370/338
See application file for complete search history.

(56) References Cited

U.S. PATENT DOCUMENTS

| | | | |
|---|---|---|---|
| 2005/0169232 A1 | 8/2005 | Sakoda et al. | |
| 2005/0201361 A1 | 9/2005 | Morioka et al. | |
| 2005/0265298 A1* | 12/2005 | Adachi et al. ................ | 370/338 |
| 2005/0285803 A1* | 12/2005 | Iacono et al. ................ | 343/702 |
| 2006/0007935 A1* | 1/2006 | Bennett ................ | H04L 1/1841 370/395.5 |
| 2006/0045048 A1* | 3/2006 | Kwon et al. .................. | 370/329 |
| 2006/0092871 A1* | 5/2006 | Nishibayashi et al. ....... | 370/328 |
| 2006/0140172 A1* | 6/2006 | Trainin ................ | H04W 99/00 370/352 |
| 2006/0153117 A1* | 7/2006 | Bichot ................ | H04W 74/02 370/316 |
| 2006/0227802 A1* | 10/2006 | Du .................... | H04W 74/0816 370/447 |
| 2007/0002814 A1* | 1/2007 | Benveniste ........... | H04W 74/00 370/338 |
| 2007/0153830 A1* | 7/2007 | Xhafa ................... | H04W 28/06 370/470 |
| 2007/0160021 A1* | 7/2007 | Xhafa ................... | H04W 74/04 370/338 |
| 2007/0171876 A1* | 7/2007 | Malik ................... | H04W 28/06 370/336 |
| 2007/0177534 A1* | 8/2007 | Chen ............................ | 370/311 |
| 2007/0201364 A1* | 8/2007 | Nakajima et al. ............ | 370/230 |
| 2008/0002615 A1* | 1/2008 | Nakajima et al. ............ | 370/328 |
| 2008/0232335 A1* | 9/2008 | Del Prado Pavon et al. ............................. | 370/338 |
| 2009/0103501 A1* | 4/2009 | Farrag et al. ................. | 370/337 |

FOREIGN PATENT DOCUMENTS

| | | |
|---|---|---|
| JP | 2006-50519 | 2/2006 |
| JP | 2006-50526 | 2/2006 |
| JP | 2006-287933 | 10/2006 |

* cited by examiner

● TFs INCLUDE BOTH STF AND LTF

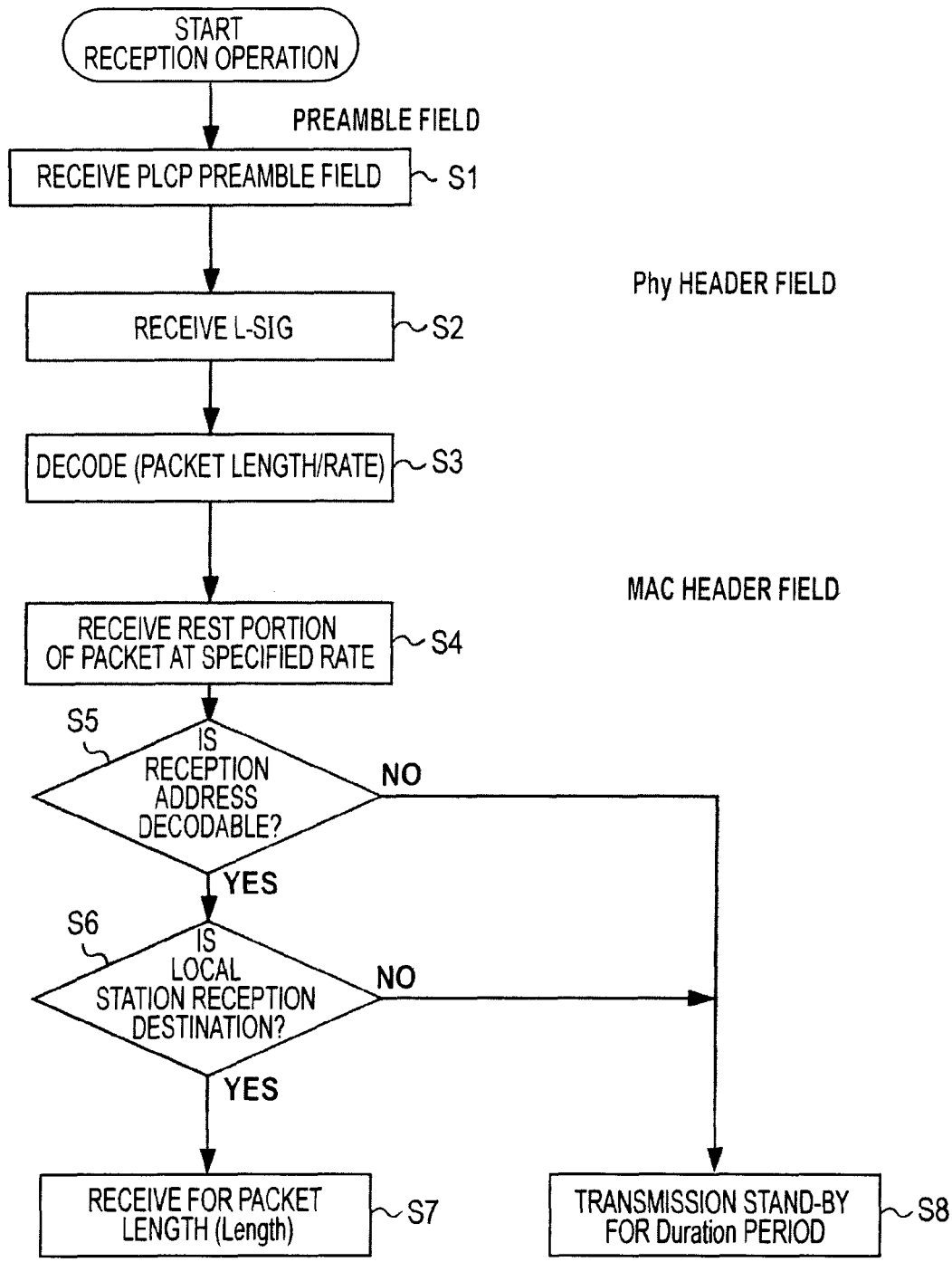

SETTING OF NETWORK ALLOCATION VECTORS IN A WIRELESS COMMUNICATION SYSTEM

TECHNICAL FIELD

The present invention relates to wireless communication systems, wireless communication apparatuses, wireless communication methods, and computer programs for allowing a plurality of wireless stations to communicate with each other as in a wireless local area network (LAN). In particular, the present invention relates to a wireless communication system, a wireless communication apparatus, a wireless communication method, and a computer program for performing random access on the basis of carrier sensing.

To be more precise, the present invention relates to a wireless communication system, a wireless communication apparatus, a wireless communication method, and a computer program for performing access control based on CSMA combined with a Request To Send/Clear To Send (RTS/CTS) system for maintaining communication quality. In particular, the present invention relates to a wireless communication system, a wireless communication apparatus, a wireless communication method, and a computer program for allowing a neighboring station having received an RTS packet to reset a Network Allocation Vector (NAV) in response to a failure in an RTS/CTS transmission/reception preparation process within a Duration period and to start a transmission operation.

BACKGROUND ART

Wireless networks have been drawing attention as systems that dispense with cables used in older wired communication systems. For example, a flexible connection to the Internet can be established using a wireless LAN. Such a wireless LAN can not only replace an existing wired LAN, but also provide a way to establish a connection to the Internet at public places including hotels, lounges at airports, stations, and cafes.

Networking in the Institute of Electrical and Electronics Engineers (IEEE) 802.11, which includes representative standards for wireless LANs, is based on the concept of Basic Service Set (BSS). There are two types of BSS: one defined in "infrastructure mode" where a control station called an "access point" (AP) or a "coordinator" exists within an area; and the other, which is an independent BSS (IBSS), defined in ad-hoc mode in which a peer-to-peer network is configured by a plurality of mobile terminals (MTs; which can be mobile stations or terminal stations) operating on equal terms in an autonomic and dispersed manner.

When performing asynchronous communication with each other in infrastructure mode, it is necessary for a transmitting communication apparatus and a receiving communication apparatus to perform wireless communication via an access point. This results in a drop as much as 50% in efficiency of using a transmission line. In contrast, in ad-hoc mode where a network includes, for example, a relatively small number of neighboring client terminals, any of the terminals can perform wireless communication directly, that is, at random, with each other without using a specific control station.

However, it is generally known that there is a hidden terminal problem in ad-hoc networks. The hidden terminal problem occurs when, in a case where specific communication stations communicate with each another, one communication station can be listened to from a communication station serving as a communication partner, but not from other communication stations. Since hidden terminals are incapable of negotiating with each other, there may be collisions of transmission operations. As a method of solving the hidden terminal problem, Carrier Sense Multiple Access (CSMA) using the RTS/CTS transmission/reception preparation process is widely known in the art.

CSMA is a communication protocol for enabling multiple accesses based on carrier sensing. In wireless communication, it is difficult for a communication apparatus to receive a signal that it has sent. Collisions thus can be avoided by using CSMA with Collision Avoidance (CSMA/CA), instead of using CSMA with Collision Detection (CSMA/CD), to allow a communication apparatus to start sending information after making sure that there is no information being sent from other information apparatuses. CSMA is an access protocol that is suitable for asynchronous data communication such as file transfer or electronic mail.

In RTS/CTS, a communication station serving as a data transmission source sends an RTS packet and, upon receipt of a CTS packet from a communication station serving as a data transmission destination, starts data transmission. When a hidden terminal receives at least one of the RTS and CTS packets, the hidden terminal sets its transmission idle period to an estimated data transmission period based on the RTS/CTS process, thereby avoiding collisions. A hidden terminal for the transmitting station receives the CTS packet and sets the transmission idle period, thereby avoiding collisions with a data packet. A hidden terminal for the receiving station receives the RTS packet and sets the transmission idle period, thereby avoiding collisions with an acknowledgement (ACK) packet.

FIG. 11 illustrates a situation that may happen in peripheral stations when a transmitting station and a receiving station perform an RTS/CTS transmission/reception preparation process. In FIG. 11, it is assumed that there are four communication stations: STA2, STA0, STA1, and STA3. It is assumed that, in a communication environment, only communication stations that are next to each other in FIG. 11 are within a range in which radio waves can reach. It is assumed that STA0 wants to send information to STA1.

STA0, which is the transmission source, checks that a medium is clear for a predetermined period (from time T0 to time T1) using a CSMA process and then sends an RTS packet to STA1 at time T1. A Medium Access Control (MAC) header of the RTS packet includes a description of Duration, which is a time for completing a transaction of transmitting and receiving this packet (in the example illustrated in FIG. 11, Duration is a time from T1 at which STA0 sends a data frame to STA1 to time T8 at which transmission of an ACK frame from STA1 is completed).

This RTS packet also reaches STA2, which is next to STA0 and which is a hidden terminal for STA1. When STA2 receives the RTS packet destined not to STA2, STA2 senses, without monitoring the medium, that the medium is busy until time T8 at which the transaction will be completed in order not to block a transmission request from STA0 and waits for the Duration period before starting transmission since the medium has already been reserved for another station. This transmission-disabled state of the hidden terminal is realized by virtual carrier sensing. Virtual carrier-sensing is used in the MAC layer protocol processing to set a Network Allocation Vector (NAV), which is a timer in units of microseconds, to an estimated time the medium will be busy. When the NAV is nonzero, the virtual carrier-sensing function recognizes that the medium is busy.

In contrast, when STA1 receives the RTS packet destined to STA1, STA1 sends a CTS packet to STA0 at time T3 after a short inter-frame space (SIFS) interval. The transmission rate and the transmission mode of the CTS packet are the same as those of the RTS packet. A MAC header of the CTS packet includes a description of Duration, which is a time for completing a transaction of transmitting and receiving this packet (that is, a time until time T8).

This CTS packet also reaches STA3, which is next to STA1 and which is a hidden terminal for STA0. When STA3 receives the CTS packet destined not to STA3, STA3 sets a NAV so that transmission will be stopped until the transaction is completed in order not to block a reception request from STA1. The NAV is effective for a period indicated by the Duration field. STA3 is also in the transmission-disabled state until time T8.

When STA0 receives the CTS packet destined to STA0, STA0 senses that STA1 is ready for reception. At time T5 after a SIFS interval, STA0 starts transmitting a data packet.

At time T6, transmission of the data packet is completed. If STA1 decodes the data packet without any errors, at time T7 after a SIFS interval, STA1 sends an ACK packet to STA0. When STA0 receives the ACK packet, a transaction of transmitting and receiving one packet is completed at time T8. STA2 and STA3, which are neighboring stations, reset the NAVs at time T8 at which the Duration period expires and return to a normal transmission/reception state.

In short, in the foregoing RTS/CTS transmission/reception preparation process, "a neighboring station of STA0 serving as a transmitting station" which has received the RTS packet, i.e., STA2, and "a neighboring station of STA1 serving as a receiving station" which has received the CTS packet, i.e., STA3, are prohibited from performing transmission. Accordingly, data can be sent from STA0 to ST1 and an ACK packet can be sent from STA1 to STA0 without being disturbed by sudden transmission signals from the neighboring stations. As a result, the quality of communication can be maintained.

FIG. 12 illustrates a frame format in IEEE 802.11a.

At the beginning of each packet, the preamble field for indicating the existence of the packet is appended. The preamble field includes an existing symbol pattern defined according to the standard. On the basis of this existing pattern, a receiver can determine whether a reception signal corresponds to the preamble field or not.

The SIGNAL field is defied after the preamble field. The SIGNAL field stores information necessary for decoding DATA fields in the packet. Information necessary for decoding the packet is referred to as the Physical Layer Convergence Protocol (PLCP) header. The PLCP header includes the RATE field indicating a transmission rate of DATA fields (including the service field, which is part of the PLCP header; hereinafter simply and collectively referred to as "DATA fields"), the LENGTH field indicating the length of the DATA fields, a parity bit, and tail bits of an encoder. On the basis of a result of decoding the RATE and LENGTH fields stored in the SIGNAL field, the receiver decodes the subsequent DATA fields.

The SIGNAL field storing the PLCP header is encoded so as to be robust against noise and is transmitted at about 6 Mbps. In contrast, in the case of general packets, the DATA fields are transmitted at a transmission rate/mode in which the highest bit rate is provided according to the signal-to-noise ratio (SNR) of the receiver as long as errors do not occur.

In IEEE 802.11a, eight transmission rates/modes are defined: 6, 9, 12, 18, 24, 36, and 54 Mbps. One of these transmission rates/modes is selected. When a transmitter and a receiver are near to each other, a transmission rate/mode providing a high bit rate is selected. A communication station at a distant place may have difficulty in decoding the information.

FIG. 13 illustrates the structure of the payload of each packet type. The payload is transferred as a Physical Layer Service Data Unit (PSDU) to a link layer which is an upper layer. In each frame, the Frame Control field and the Duration field are commonly defined. The Frame Control field stores information indicating the type and purpose of the frame. The Duration field stores information indicating the purpose of a NAV, that is, a time for completing a series of transactions relating to the packet.

An RTS frame includes, besides the foregoing fields, the Receiver Address (RA) field indicating an addressee or destination, the Transmitter Address (TA) field indicating a transmission source, and the Frame Check Sequence (FCS) field which is checksum. A CTS frame and an ACK Frame include, besides the foregoing fields, the RA field indicating an addressee or destination and the FCS field which is checksum. A data frame includes, besides the foregoing fields, four address fields Addr1 to 4 for specifying communication stations serving as the transmission source, the destination, and the like, the sequence field (SEQ), the Frame Body which is the actual data to be provided to an upper layer, and the FCS field which is checksum.

In a communication sequence in which data transmission begins in accordance with the RTS/CTS transmission/reception preparation process shown in FIG. 11, STA2, which is a neighboring station of STA0 serving as a transmission source, sets a NAV upon receipt of an RTS packet to a long period until the packet transmission/reception transaction is completed (until time T8). As a result, STA2 enters a transmission-disabled state.

In contrast, when STA0 is incapable of receiving a CTS packet from STA1 serving as a transmission destination, the RTS/CTS transmission/reception preparation process fails, and the subsequent sequence is cancelled (no data frame is sent by STA0 at time T5). In such a case, it is a waste for STA2, which is the neighboring station, to continuously set the NAV to a long period until a series of transmission/reception transactions is completed (that is, until time T8). This may even cause a reduction in the throughput of the entire system.

To overcome such a situation, the "NAV reset" function is provided. That is, when a neighboring station that has received an RTS or CTS packet and set a NAV once senses a failure in the RTS/CTS transmission/reception preparation process, the neighboring station resets the NAV so that the neighboring station can start a transmission operation.

For example, a neighboring station of a transmitter that has sent an RTS packet receives the RTS packet destined to another station and sets a NAV. Thereafter, if this neighboring station detects no CTS packet sent from a destination of the RTS packet or no data packet sent from the transmitter of the RTS packet within a predetermined time even in the Duration period, the neighboring station senses that the RTS/CTS transmission/reception preparation process has failed and resets the NAV. The predetermined time before the NAV is reset corresponds to a time from completion of reception of the RTS packet to an estimated arrival time of a data packet from the transmitter of the RTS packet (that is, T5-T2 in the example shown in FIG. 11) and is determined on the basis of the length of the CTS packet. More specifically, the arrival time of a data packet can be estimated on the basis of the sum of two SIFS intervals and a reception time of the CTS packet (for example, see ANSI/IEEE Std 802.11, 1999 Edition (R2003), 9.2.5.4 Setting and resetting the NAV).

In some cases, the foregoing calculating method may fail to estimate the correct arrival time of a data packet. If the arrival time of a data packet is estimated to be later, the neighboring station performs the virtual carrier sensing for the wasted time, and the efficiency of using the bandwidth is reduced. In contrast, if the arrival time of a data packet is estimated to be earlier, the neighboring station starts a transmission operation even when the RTS/CTS transmission/reception preparation process being performed is in order. This results in contention of access. In particular, the latter problem is overcome only by avoiding the use of the NAV reset function, and the throughput of the system is difficult to improve.

The following description concerns exemplary cases in which a neighboring station that has received an RTS packet fails to estimate the arrival time of a data packet.

In one case, the neighboring station fails to calculate the correct scheduled reception completion time of the CTS packet. The scheduled reception completion time of the CTS packet can be calculated on the basis of the frame length of the CTS packet and the transmission rate of the RTS packet (the transmission rate of the CTS packet is the same as that of the corresponding RTS packet).

For example, IEEE 802.11n, which is an expanded standard of IEEE 802.11a/g, is intended to improve the effective throughput by adding multiple-input multiple-output (MIMO), which is the use of multiple antennas at both the transmitter and the receiver to realize spatial multiplexing. A detailed description of the mechanism of MIMO communication is omitted here. In a MIMO communication system using two or more transmission branches, it shall be noted that, in order to realize spatial separation of a spatially-multiplexed reception signal, it is necessary for the receiver to estimate a channel for each transmission/reception antenna and to obtain a channel matrix. The transmitter is configured to send a training signal for activating a channel from each transmission channel in a time-division manner (for example, see FIG. 8A of Japanese Unexamined Patent Application No. 2006-36018, which has already been assigned to the Assignee of the present invention). In other words, since the length of the preamble field is variable according to the number of transmission antennas, so is the length of the CTS packet.

FIG. 14 illustrates an exemplary format of a packet including training signals sent in a time-division manner according to the number of transmission antennas. In FIG. 14, a portion referred to as a high throughput long training field (HT-LTF) is a training signal for activating a channel. The HT-LTF is sent from each transmission antenna. Therefore, the receiver corresponding to high throughput (HT) mode obtains a channel coefficient according to each pair of transmission/reception antennas and arranges the obtained channel coefficients in a matrix, thereby obtaining a channel matrix.

IEEE 802.11n defines "mixed mode" as an operation mode allowing the coexistence with legacy terminals operating in a legacy mode based on the previous IEEE 802.11a/g standard. Legacy terminals are incapable of coping with differences in the CTS packet length according to the number of antennas. As a result, it becomes difficult to estimate the correct timing to perform the NAV reset function. In FIG. 14, fields beginning with "L-" are transmitted at a transmission rate using a modulation method that are decodable at legacy terminals. In contrast, fields beginning with "HT-" are not compatible with legacy terminals.

IEEE 802.11n allows the coexistence with legacy terminals. There is a problem that legacy terminals are incapable of decoding the MAC frame field transmitted in high-speed HT mode. That is, legacy terminals are incapable of analyzing the Duration field in the MAC header and setting a correct NAV. In order to solve this problem, a spoofing technique that carries Duration information using the RATE field and the LENGTH field in the PHY header which is decodable at legacy terminals is employed (for example, see Japanese Unexamined Patent Application Publication No. 2006-50526, paragraphs 0066 to 0068). Spoofing stores in the LENGTH field of the PHY header a spoofed value, instead of the original packet length, so that the (packet length/transmission rate) should indicate a period for which a NAV is to be set, such as until completion of ACK. In the case where a neighboring station that has received an RTS packet sent in HT mode is a legacy terminal, the legacy terminal mistakes a period until completion of ACK for a transmission period of the RTS packet and thus continuously remains to be in a transmission-disabled state. In this spoofed Duration period, no trigger for resetting the NAV is generated.

In the RTS/CTS transmission/reception preparation process, under normal circumstances, a communication station serving as a data transmission source sends an RTS packet to a communication station serving as a data transmission destination, and the data transmission destination sends a CTS packet in response to the RTS packet to the data transmission source. When the data transmission destination wants to send data to the data transmission source in the opposite direction, the data transmission destination may multiplex a CTS packet with a data packet and send the multiplexed packets to the data transmission source (for example, see Japanese Unexamined Patent Application Publication No. 2006-50519, paragraph 0288, FIG. 24). In such a case, the length of the CTS packet is not fixed, unlike in FIG. 13. A neighboring station that has received the RTS packet is thus incapable of estimating the arrival time of the data packet. As a result, even when the transmission preparation fails, the neighboring station has difficulty in resetting the NAV.

If the neighboring station fails to specify a predetermined time for completing transmission of a response frame, the NAV reset function is not employed. The use of NAV reset was previously limited to the case where an RTS/CTS transmission/reception preparation process that enables specifying the predetermined time on the basis of the length of the CTS packet is performed. However, the transmission preparation process is not limited to RTS/CTS in wireless networks based on IEEE 802.11 or the like. The performance of NAV reset is thus insufficient and leaves room for improvement in order to increase the throughput of the entire system.

For example, Block ACK Request (BAR) is proposed to increase the speed of the MAC layer. In BAR, the data transmission source continuously sends data packets to the data transmission destination at SIFS intervals in a transmission opportunity (TXOP) period. After the TXOP period, the data transmission source sends a BAR frame to the data transmission destination. In response to this, the data transmission destination sends a Block ACK frame to the data transmission source. According to BAR, a data packet of a short length is initially sent, which enables a neighboring station to set a NAV. However, since the Block ACK protocol is not a necessity of IEEE 802.11, neighboring stations not compatible with this protocol are incapable of resetting a NAV even when the transmission/reception preparation process fails.

In order to overcome the problem of setting an unnecessary NAV in response to a failure in transmission of a CTS packet, MAC has been proposed (for example, see Japanese Unexamined Patent Application Publication No. 2006-287933, paragraph 0016). MAC allows a communication station that has received an RTS packet destined to itself to wait for the time interval of SIFS, send a CTS packet, and enter a carrier sensing state. After a predetermined CLR_Threshold time period has elapsed, if the channel is sensed idle, the communication station sends a cancel packet for allowing a neighboring station to reset a NAV. Accordingly, an unnecessary NAV can be reset at a neighboring station of the communication station sending the CTS packet (i.e., the data transmission destination). However, resetting the NAV involves the overhead of sending a packet other than RTS/CTS packets from a communication station performing the transmission preparation. This is considered to be inefficient. The scheme of resetting a NAV using a cancel packet is not a necessity of existing wireless LAN standards including IEEE 802.11 and thus incompatible with existing communication terminals.

DISCLOSURE OF INVENTION

It is desirable to provide an excellent wireless communication system, a wireless communication apparatus, a wireless communication method, and a computer program for suitably maintaining the quality of communication in access control based on CSMA by using a process of exchanging transmission preparation packets including RTS and CTS packets.

It is also desirable to provide an excellent wireless communication system, a wireless communication apparatus, a wireless communication method, and a computer program for allowing a neighboring station that has received an RTS packet to reset a NAV in response to a failure in the RTS/CTS transmission/reception preparation process in the Duration period and thereby to start a transmission operation.

It is also desirable to provide an excellent wireless communication system, a wireless communication apparatus, a wireless communication method, and a computer program for allowing, in a wireless network in which the exchange of data packets begins after a neighboring station is allowed to set a NAV by informing the neighboring station of Duration information by exchanging RTS/CTS packets or other transmission preparation packets, the neighboring station to appropriately reset the NAV in response to a failure in the process for exchanging the data packets.

According to a first embodiment of the present invention, there is provided a wireless communication system including communication stations in which transmission of data packets begins after a predetermined transmission/reception preparation process is performed between communication stations serving as a data transmission source and a data transmission destination. The communication station serving as the data transmission source stores, in a header of a preparation packet to be sent for the transmission/reception preparation process, first duration information corresponding to an end of a first response packet sent from the communication station serving as the data transmission destination in response to the preparation packet and second duration information corresponding to an end of a second response packet sent from the communication station serving as the data transmission destination in response to a data packet sent from the communication station serving as the data transmission source after the transmission/reception preparation process. A neighboring station having received the preparation packet including the duration information sent from the communication station serving as the data transmission source sets a first network allocation vector relating to a scheduled reception completion time of the first response packet on the basis of the first duration information and a second network allocation vector relating to a scheduled reception completion time of the second response packet on the basis of the second duration information and ignores the second network allocation vector in a case where no packet transmission is detected within a period for which the first network allocation vector has been set or within a predetermined time after the scheduled reception completion time of the first response packet.

As a modification of the wireless communication system, the neighboring station having received the preparation packet sent from the communication station serving as the data transmission source may set a first network allocation vector relating to a scheduled reception completion time of the first response packet on the basis of the first duration information and, thereafter, in response to detection of packet transmission within a predetermined time after the scheduled reception completion time of the first response packet, may set a second network allocation vector relating to a scheduled reception completion time of the second response packet on the basis of the second duration information.

The "system" herein refers to a logical combination of a plurality of apparatuses (or functional modules for achieving specific functions), without regard to whether the apparatuses or functional modules reside within a single casing (the same applies hereinafter).

A communication sequence widely adopted in a wireless network where random access is performed is as follows. That is, communication stations for exchanging data packets perform an RTS/CTS transmission/reception preparation process or the like, and a neighboring station is allowed to set a NAV and thus enter a transmission-disabled state. Thereafter, data transmission begins. By using this type of transmission/reception preparation process, communication quality can be secured.

In contrast, when the neighboring station having transmission data remains to be in the transmission-disabled state for a long time although the transmission/reception preparation process has failed before being completed, this causes a reduction in the throughput of the entire system. To overcome such a situation, the "NAV reset" function is provided. That is, when the neighboring station senses a failure in the transmission/reception preparation process, the neighboring station resets a NAV so that the neighboring station can start a transmission operation.

However, there are various types of response packets in expanded standards including IEEE 802.11n. It is thus difficult for a neighboring station having received a packet indicating the start of transmission preparation, such as an RTS packet, to specify a reception completion time of a response packet. As a result, the neighboring station fails to properly reset the NAV.

In IEEE 802.11, basically the use of NAV reset is limited to the transmission/reception preparation process using RTS/CTS packets. However, the preparation process before sending data packets is not limited to RTS/CTS packets. Small data and ACK packets may replace the transmission/reception preparation process. A Block ACK Request/Block ACK process is also available. Even when these transmission/reception preparation process fail, the neighboring station does not reset a NAV.

According to the wireless communication system of the embodiment of the present invention, it is assumed that a communication station serving as a data transmission source stores two types of duration information in the header of a packet indicating the start of transmission preparation, such as an RTS packet. According to IEEE 802.11n, the first duration information is a value obtained by dividing the packet length by the transmission rate (packet length/transmission rate) based on spoofed values in the RATE and LENGTH field in the PHY header. The second duration information is stored in the Duration field defined in the MAC specification of IEEE 802.11.

According to the embodiment of the present invention, the communication station serving as the data transmission source stores, in a header of a preparation packet to be sent for the transmission/reception preparation process, first duration information corresponding to an end of a first response packet (e.g., a CTS packet) sent from the communication station serving as the data transmission destination in response to the preparation packet and second duration information corresponding to an end of a second response packet (e.g., an ACK packet sent after a data packet) sent from the communication station serving as the data transmission destination in response to a data packet sent from the communication station serving as the data transmission source after the transmission/reception preparation process.

In contrast, a neighboring station of the communication station serving as the data transmission source basically sets first and second network allocation vectors so as not to interfere with the exchange of data packets. That is, the neighboring station sets a first network allocation vector relating to a scheduled reception completion time of the first response packet (e.g., a CTS packet) on the basis of the first duration information. Thereafter, when packet transmission is not detected within a predetermined time after the scheduled reception completion time of the first response packet, the neighboring station ignores or resets the second network allocation vector. That is, no unnecessary network allocation vector is set after the scheduled reception completion time of the CTS packet. Thus, a transmission operation can be instantaneously started.

The fact that the transmission/reception preparation process has failed is unfortunate for the communication stations serving as the data transmission source and the data transmission destination. However, the throughput of the entire system is improved by resetting a NAV in a neighboring station.

Alternatively, upon receipt of the preparation packet, a neighboring station of the communication station serving as the data transmission source sets a first network allocation vector relating to a scheduled reception completion time of the first response packet (e.g., a CTS packet) on the basis of the first duration information and, thereafter, in response to detection of packet transmission within a predetermined time after the scheduled reception completion time of the first response packet, sets a second network allocation vector relating to a scheduled reception completion time of the second response packet on the basis of the second duration information. In other words, if the neighboring station detects no data packet within the predetermined time after the scheduled reception completion time of the CTS packet, the neighboring station determines that the transmission/reception preparation process has failed and thereafter sets no NAV.

The fact that the transmission/reception preparation process has failed is unfortunate for the communication stations serving as the data transmission source and the data transmission destination. However, the throughput of the entire system is improved by setting no NAV in a neighboring station.

Although RTS/CTS is widely known as a transmission/reception preparation process, the scope of the present invention is not limited thereto. For example, the neighboring station can reset an unnecessary NAV in response to a failure in the transmission/reception preparation process similarly in the case where small data and ACK packets replace the transmission/reception preparation process or in a Block ACK Request/Block ACK process.

The data packet sent from the communication station serving as the data transmission source and the second response packet sent in response to the data packet may be transmitted one or more times. That is, it shall be understood that the data/ACK sequence may be repeated a plurality of times after the RTS/CTS sequence.

According to a second embodiment of the present invention, there is provided a computer program written in a computer-readable format for causing a computer to execute a process for performing wireless communication in a wireless network in which transmission of data packets begins after a transmission/reception preparation process is performed between communication stations serving as a data transmission source and a data transmission destination and at least two types of duration information are stored in a header of a preparation packet sent from the communication station serving as the data transmission source for the transmission/reception preparation process. The process includes the steps of, in a case where the communication station serving as the data transmission source stores, in the header of the preparation packet to be sent for the transmission/reception preparation process, first duration information corresponding to an end of a first response packet sent from the communication station serving as the data transmission destination in response to the preparation packet and second duration information corresponding to an end of a second response packet sent from the communication station serving as the data transmission destination in response to a data packet sent from the communication station serving as the data transmission source after the transmission/reception preparation process, upon receipt of the preparation packet sent from the communication station serving as the data transmission source to another communication station serving as the data transmission destination, setting a first network allocation vector relating to a scheduled reception completion time of the first response packet on the basis of the first duration information; setting a second network allocation vector relating to a scheduled reception completion time of the second response packet on the basis of the second duration information; and ignoring the second network allocation vector in a case where no packet transmission is detected within a period for which the first network allocation vector has been set or within a predetermined time after the scheduled reception completion time of the first response packet.

The computer program according to the second embodiment of the present invention defines a computer program written in a computer-readable format for causing a computer to execute a predetermined process. In other words, the computer program according to the second embodiment of the present invention is installed into a computer, thereby exhibiting a cooperative operation on the computer, and the computer operates as a wireless communication apparatus.

Such a wireless communication apparatus avoids access contention by setting, as a neighboring station, a NAV in the case where transmission of data packets begins after a transmission/reception preparation process is performed between other communication stations in a wireless network. When the transmission/reception preparation fails, the wireless communication apparatus can appropriately reset the NAV. Accordingly, the same advantages as those of the wireless communication system according to the first embodiment of the present invention can be achieved.

According to the embodiments of the present invention, it is possible to provide an excellent wireless communication system, a wireless communication apparatus, a wireless communication method, and a computer program for suitably maintaining the quality of communication in access control based on CSMA by using a process of exchanging transmission preparation packets including RTS and CTS packets.

According to the embodiments of the present invention, it is also possible to provide an excellent wireless communication system, a wireless communication apparatus, a wireless communication method, and a computer program for allowing a neighboring station that has received an RTS packet to reset a NAV in response to a failure in the RTS/CTS transmission/reception preparation process in the Duration period and thereby to start a transmission operation.

According to the embodiments of the present invention, it is also possible to provide an excellent wireless communication system, a wireless communication apparatus, a wireless communication method, and a computer program for allowing, in a wireless network in which the exchange of data packets begins after a neighboring station is allowed to set a NAV by informing the neighboring station of Duration information by exchanging RTS/CTS packets or other transmission preparation packets, the neighboring station to appropriately reset the NAV in response to a failure in the process for exchanging the data packets.

According to the embodiments of the present invention, the medium can be effectively used in the case where the RTS/CTS transmission/reception preparation process or the like fails. In particular, the throughput of the system is improved in a hidden terminal environment where the transmission/reception preparation process frequently fails.

Further features of the present invention will become apparent from the following description of exemplary embodiments with reference to the attached drawings.

BRIEF DESCRIPTION OF THE DRAWINGS

FIG. 9 is a flowchart of a reception process in the case where the wireless communication apparatus operates as a legacy terminal;

FIG. 12 is an illustration of a frame format in IEEE 802.11a;

REFERENCE NUMERALS

Figure 1:
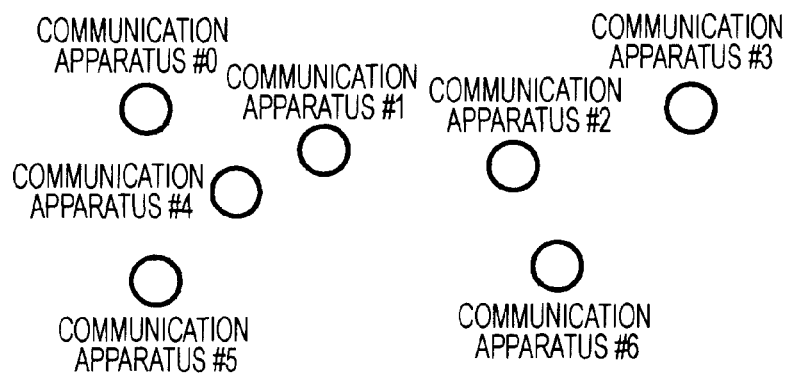
FIG. 1 is an illustration of an exemplary arrangement of communication apparatuses constituting a wireless communication system according to an embodiment of the present invention.

100: wireless communication apparatus
101: interface
102: data buffer
103: central control unit
104: wireless transmission unit
105: timing control unit
106: antenna
107: wireless reception unit
108: information storage unit

BEST MODE FOR CARRYING OUT THE INVENTION

Embodiments of the present invention will now herein be described with reference to the drawings.

A propagation path of communication assumed in an embodiment of the present invention is wireless. A plurality of communication stations constitute a network. Communication assumed in the embodiment of the present invention involves traffic in store and forward mode. Information is transferred in units of packets. In a wireless network according to the embodiment of the present invention, communication stations directly (randomly) send information in accordance with an access procedure based on CSMA and thereby constitute an autonomic and dispersed wireless network.

According to an embodiment of the present invention, for example, a communication environment in which legacy stations in accordance with the previous IEEE 802.11a/g and HT stations in conformance with IEEE 802.11n, which corresponds to a high-speed standard using the same bandwidth as IEEE 802.11a/g, is assumed. That is, there are two types of communication terminals, namely, legacy stations that can transmit/receive packets modulated using a certain limited modulation method and HT stations that can transmit/receive packets that are modulated using not only a modulation method that existing stations can transmit/receive but also an advanced method.

FIG. 1 is an illustration of an exemplary arrangement of communication apparatuses constituting a wireless communication system according to an embodiment of the present invention. In the wireless communication system, the communication apparatuses do not have a controller-controlled relationship. The communication apparatuses operate in an autonomic and dispersed manner and form an ad-hoc network. In FIG. 1, communication apparatuses #0 to #6 are distributed in the same space.

In FIG. 1, a communication range of each communication apparatus is represented by broken lines. Each communication apparatus can communicate with other communication apparatuses within its range. Further, a signal transmitted from each communication apparatus interferes with other signals within its range. That is, communication apparatus #0 is within a range in which communication apparatus #0 can communicate with neighboring communication apparatuses #1 and #4; communication apparatus #1 is within a range in which communication apparatus #1 can communicate with neighboring communication apparatuses #0, #2, and #4; communication apparatus #2 is within a range in which communication apparatus #2 can communicate with neighboring communication apparatuses #1, #3, and #6; communication apparatus #3 is within a range in which communication apparatus #3 can communicate with a neighboring communication apparatus #2; communication apparatus #4 is within a range in which communication apparatus #4 can communicate with neighboring communication apparatuses #0, #1, and #5; communication apparatus #5 is within a range in which communication apparatus #5 can communicate with a neighboring communication apparatus #4; and communication apparatus #6 is within a range in which communication apparatus #6 can communicate with a neighboring communication apparatus #2.

In a case where specific communication apparatuses communicate with each another, the "hidden terminal" problem occurs when one communication apparatus can be listened to from a communication apparatus serving as a communication partner, but not from other communication apparatuses.

The scope of the embodiment of the present invention is not limited to the foregoing ad-hoc environment. The embodiment of the present invention is widely applicable to various communication formats in which communication stations inform neighboring stations of Duration information by using an RTS/CTS transmission/reception preparation process or another transmission/reception preparation process so that the medium can be secured.

Figure 2:
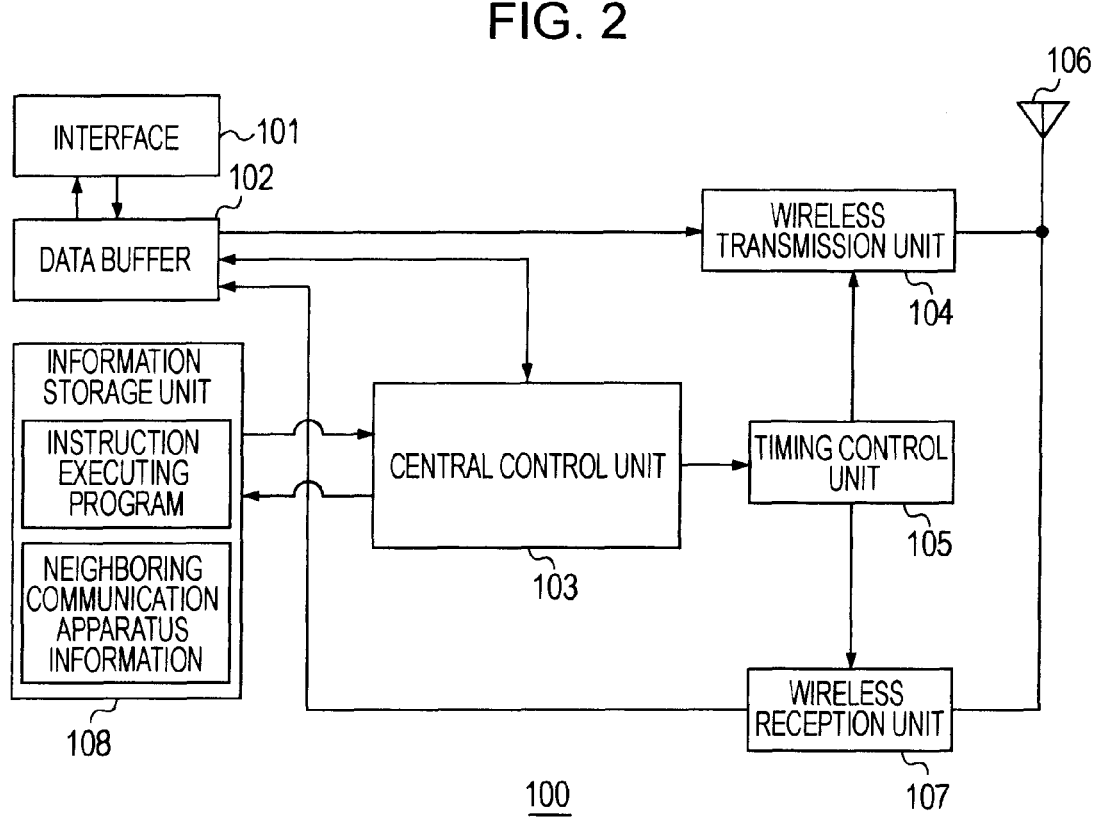
FIG. 2 is a block diagram of a functional configuration of a wireless communication apparatus operating as a communication station in a wireless network according to an embodiment of the present invention.

FIG. 2 is a block diagram of a functional configuration of a wireless communication apparatus operating as a communication station in a wireless network according to an embodiment of the present invention. The wireless communication apparatus shown in FIG. 2 can constitute a network by performing access control based on CSMA while additionally using an RTS/CTS transmission/reception preparation process or the like in an autonomic and dispersed communication environment where there is no control station. The following description assumes that the wireless communication apparatus can operate as a legacy terminal that performs a communication operation according to IEEE 802.11a/g or an HT terminal that performs a communication operation according to IEEE 802.11n in networking based on IEEE 802.11.

As shown in FIG. 2, a wireless communication apparatus 100 includes an interface 101, a data buffer 102, a central control unit 103, a wireless transmission unit 104, a timing control unit 105, an antenna 106, a wireless reception unit 107, and an information storage unit 108.

The interface 101 exchanges various types of information with an external device (e.g. a personal computer (not shown)) connected to the wireless communication apparatus 100.

The data buffer 102 is used to temporarily store data sent from the connected device via the interface 101 or, before sending via the interface 101, data received via a wireless transmission line.

The central control unit 103 performs integrated control of a series of transactions of transmitting/receiving information in the wireless communication apparatus 100 and access control of a transmission line. For example, the central control unit 103 performs MAC based on CSMA while additionally using the RTS/CTS transmission/reception preparation process or the like. When the wireless communication apparatus 100 performs a data transmission operation, the wireless communication apparatus 100 stores Duration information in the header (PHY header or MAC header) of a packet such as an RTS packet or a CTS packet. If the wireless communication apparatus 100 is a neighboring station (hidden terminal), the wireless communication apparatus 100 performs virtual carrier sensing on the basis of the Duration information stored in the PHY header or the MAC header of a transmission preparation packet, such as an RTS packet. Until a series of transmission/reception transactions is completed, the wireless communication apparatus 100 remains in a transmission-disabled state so that packet exchange will not be disturbed. If the RTS/CTS transmission/reception preparation process or the like fails, a NAV that has been set upon receipt of the transmission preparation packet is appropriately reset. This is intended for efficient use of the medium and improvement of the throughput of the entire system. A MAC process will be described in detail later.

The wireless transmission unit 104 includes a modulator that modulates a transmission signal using a predetermined modulation method, a digital-to-analog (D/A) converter that converts a digital transmission signal into an analog signal, an up-converter that up-converts the analog transmission signal by performing frequency conversion, and a power amplifier (PA) that amplifies power of the up-converted transmission signal (none of which are shown in FIG. 2). The wireless transmission unit 104 wirelessly transmits data and beacon signals temporarily stored in the data buffer 102 at predetermined transmission rates.

The wireless reception unit 107 includes a low-noise amplifier (LNA) that amplifies the voltage of a signal received from another station via the antenna 106, a down-converter that down-converts the voltage-amplified reception signal by performing frequency conversion, an automatic gain controller (AGC), an analog-to-digital (A/D) converter that converts an analog reception signal into a digital signal, a demodulator that demodulates a signal by performing synchronization processing for achieving synchronization, channel estimation, and demodulation processing using a predetermined demodulation method (none of which are shown in FIG. 2). The wireless reception unit 107 receives information and beacon signals sent from other wireless communication apparatuses at predetermined times.

The antenna 106 wirelessly sends a signal on a predetermined frequency channel to another wireless communication apparatus or collects a signal sent from another wireless communication apparatus.

In the case where the wireless communication apparatus 100 is an HT terminal according to IEEE 802.11n, the wireless communication apparatus 100 may include two or more antennas, and the wireless transmission unit 104 and the wireless reception unit 107 may perform MIMO communication. However, since the MIMO communication scheme is not directly related to the gist of the present invention, a detailed description thereof is omitted in the specification.

The timing control unit 105 performs timing control for transmitting and receiving wireless signals. For example, the timing control unit 105 sets a predetermined inter-frame space (IFS) and a back-off period on the basis of the result of carrier sensing performed by the wireless reception unit 107 and performs control of a transmission timing and a reception timing of packets including RTS, CTS, Data, and ACK.

The information storage unit 108 stores an execution procedure instruction for performing a series of access control operations (program describing a collision avoidance procedure), which is executed by the central control unit 103, and neighboring apparatus information obtained from the result of analyzing transmission preparation packets including RTS and CTS packets and other control signals.

The PHY layer in IEEE 802.11n has high throughput transmission mode (hereinafter may also be referred to as "HT mode") that is entirely different from the transmission method including the modulation method and encoding method of the previous IEEE 802.11a/g, as well as an operation mode in which data transmission is performed using the same packet format and the same frequency range as in the previous IEEE 802.11a/g (hereinafter may also be referred to as "legacy mode"). HT mode can be divided into an operation mode called "mixed mode" compatible with existing terminals in conformance with IEEE 802.11a/g (hereinafter may also be referred to as "legacy terminals") and an operation mode called "green field (GF)" which is not compatible with legacy terminals. Since GF mode is not directly related to the gist of the present invention, a detailed description thereof is not given in the specification.

Figure 3:
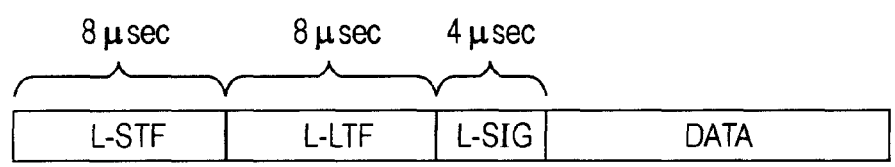
FIG. 3 is an illustration of a packet format in legacy mode of IEEE 802.11n.
Figure 4:
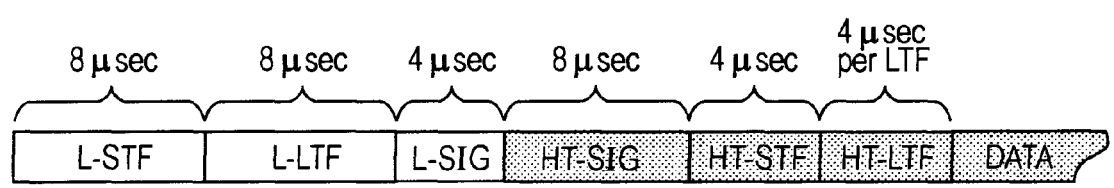
FIG. 4 is an illustration of a packet format in mixed mode of IEEE 802.11n.

FIG. 3 illustrates a packet format in legacy mode. FIG. 4 illustrates a packet format in mixed mode. In FIGS. 3 and 4, it is assumed that one orthogonal frequency division multiplexing (OFDM) symbol corresponds to four microseconds.

Figure 5:
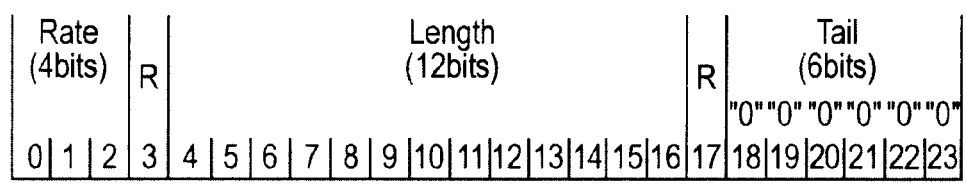
FIG. 5 is an illustration of a data structure of the legacy SIGNAL (L-SIG) field.

A packet in legacy mode shown in FIG. 3 (hereinafter may also be referred to as a "legacy packet") has the same format as that of IEEE 802.11a/g. The header of the legacy packet includes, as a legacy preamble field, a legacy short training field (L-STF) including existing OFDM symbols for discovering the packet, a legacy long training field (L-LTF) including existing training symbols for achieving synchronization and equalization, and a legacy SIGNAL field (L-SIG) describing a transmission rate and a data length. After this, a payload (data) is transmitted. The data structure of the L-SIG field is shown in FIG. 5.

The header of a packet in HT mode shown in FIG. 4 (hereinafter may also be referred to as an "MM packet") includes a legacy preamble field having the same format as that of IEEE 802.11a/g, which is followed by a preamble field having a unique format (hereinafter may also be referred to as "HT format") of IEEE 802.11n (hereinafter may also be referred to as an "HT preamble"), and a payload (data). In the MM packet, a portion corresponding to the PHY payload in the legacy packet is in the HT format. Recursively, the portion in the HT format can be regarded as being constituted of the HT preamble and the PHY payload.

The HT preamble includes HT-SIG, HT-STF, and HT-LTF. HT-SIG includes information necessary for analyzing the HT format, such as modulation and coding scheme (MCS) applied in the PHY payload (PSDU), the data length of the payload, and the like. HT-STF includes a training symbol for improving AGC in the MIMO system. HT-LTF includes a training symbol for estimating a channel for each input signal that has been spatially modulated (mapped) at a receiver.

Figure 14:
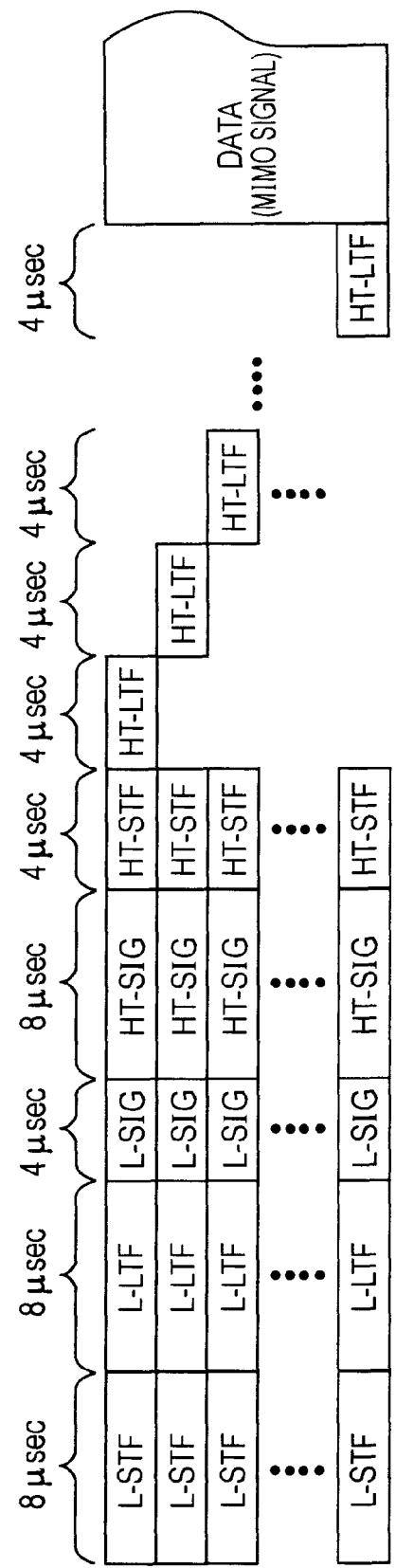
FIG. 14 is an illustration of an exemplary format of a packet including training signals sent in a time-division manner according to the number of transmission antennas.
Figure 15:
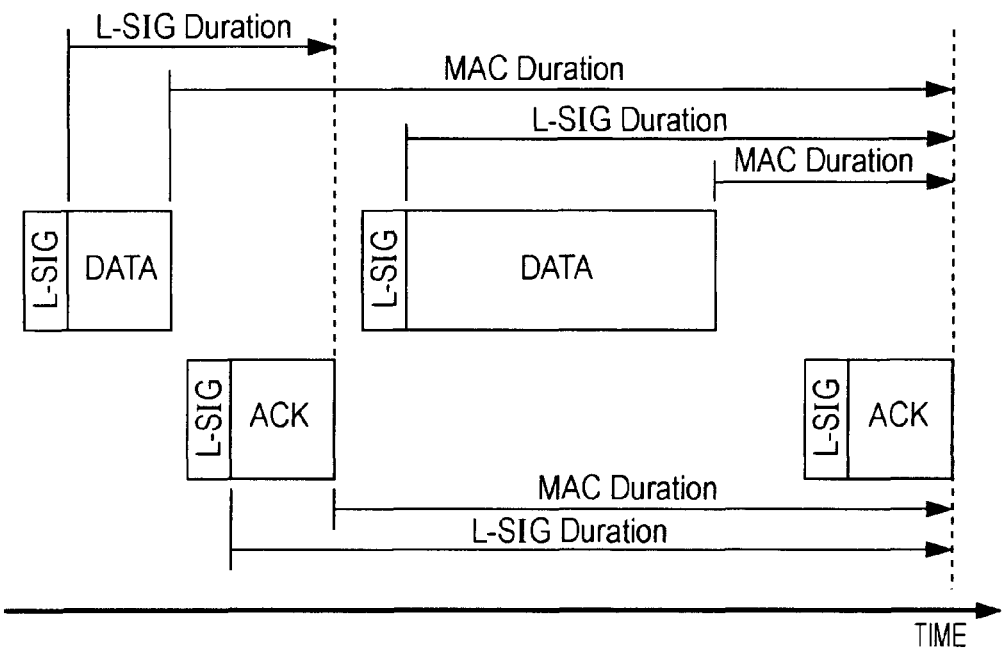
FIG. 15 is an illustration of a method of setting L-SIG Duration (NAV 1) and MAC-Duration (NAV 2) in a data/ACK process.
Figure 16:
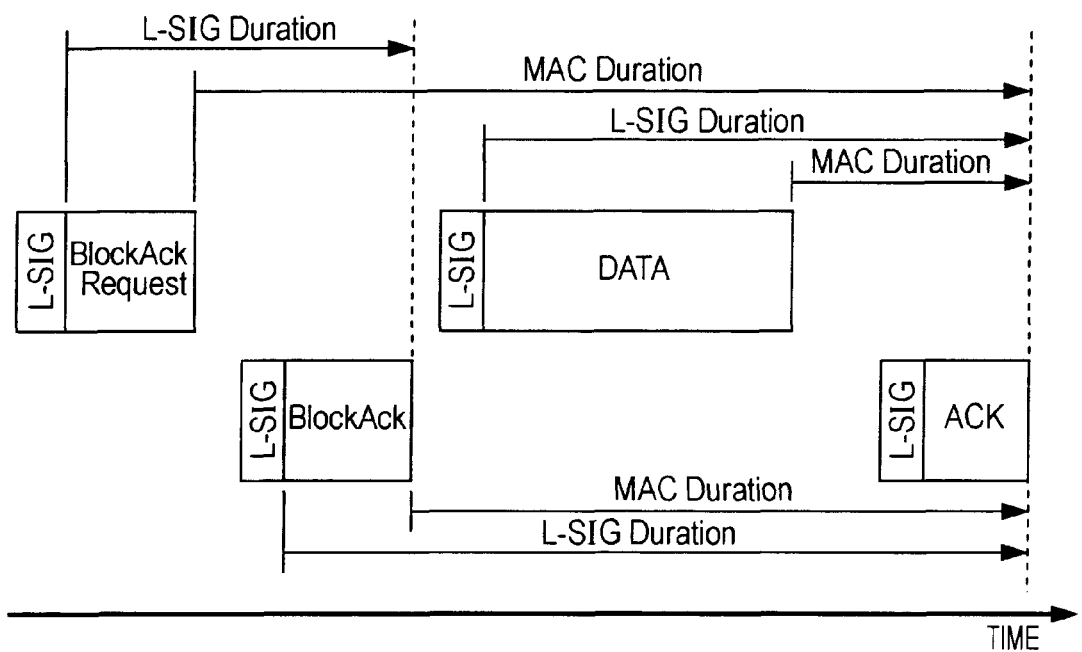
FIG. 16 is an illustration of a method of setting L-SIG Duration (NAV 1) and MAC-Duration (NAV 2) in a Block ACK Request/Block ACK process.

In the case of the foregoing MIMO communication system using two or more spatially-multiplexed transmission streams, it is necessary for the receiver side to realize spatial separation of a reception signal, that is, to estimate a channel for each transmission/reception antenna and to obtain a channel matrix. To this end, the transmitter sends HT-LTF from each transmission antenna in a time-division manner. This results in appending one or more HT-LTF fields according to the number of spatial streams (see FIG. 14).

The legacy preamble field in the MM packet has the same format as that of the preamble field of the legacy packet and is transmitted using a transmission method that is decodable at legacy terminals. In contrast, an HT-format portion after the HT preamble is sent using a transmission method incompatible with legacy terminals.

The mixed mode of IEEE 802.11n ensures the compatibility with legacy terminals. Here, legacy terminals are incapable of decoding the MAC frames transmitted in high-speed HT mode. That is, legacy terminals have difficulty in analyzing the Duration field in the MAC header and thus are incapable of correctly setting a NAV. In order to overcome this problem, spoofing is employed to carry Duration information using the RATE field and LENGTH field in the PHY header decodable at legacy terminals (for example, see Japanese Unexamined Patent Application Publication No. 2006-50526).

Figure 6:
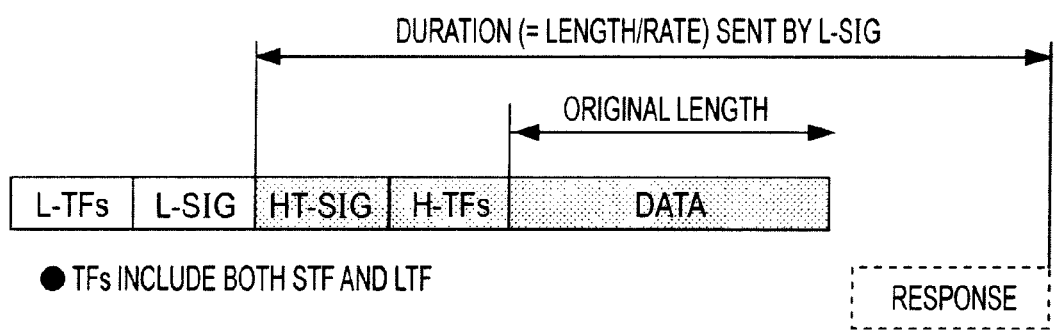
FIG. 6 is an illustration for describing Duration information in the L-SIG field of a packet in HT mode (or an MM packet)

The spoofing technique currently proposed in IEEE 802.11n stores in the LENGTH field of the PHY header a spoofed value, instead of the original packet length, so that the (packet length/transmission rate) should indicate a period for which a NAV is to be set. That is, under normal circumstances, the data length after L-SIG, that is, from the end of the HT-SIG field to the end of the Data field (payload), should be written in the LENGTH field of L-SIG. However, in the case of a packet sent by an HT terminal, as shown in FIG. 6, (packet length/transmission rate) indicating a period from completion of transmission of L-SIG to completion of transmission of a response, such as ACK, is described in the LENGTH field.

In the case where a legacy terminal serving as a neighboring station receives the MM packet, even if the legacy terminal is incapable of decoding the MAC header in the HT format and obtaining the correct Duration information, the legacy terminal mistakes a period until completion of the response for a transmission period of this packet and continues to be in the transmission-disabled state. As a result, the MM packet can realize compatibility with the legacy terminal. Needless to say, when an HT terminal serving as a neighboring station receives the MM packet shown in FIG. 4, the HT terminal obtains the correct Duration information from the MAC header in the HT format and sets a NAV for a period until transmission of a response is completed.

In the following description, Duration information stored in L-SIG is referred to as "L-SIG Duration", and normal Duration information stored in the MAC header is referred to as "MAC Duration".

Figure 7:
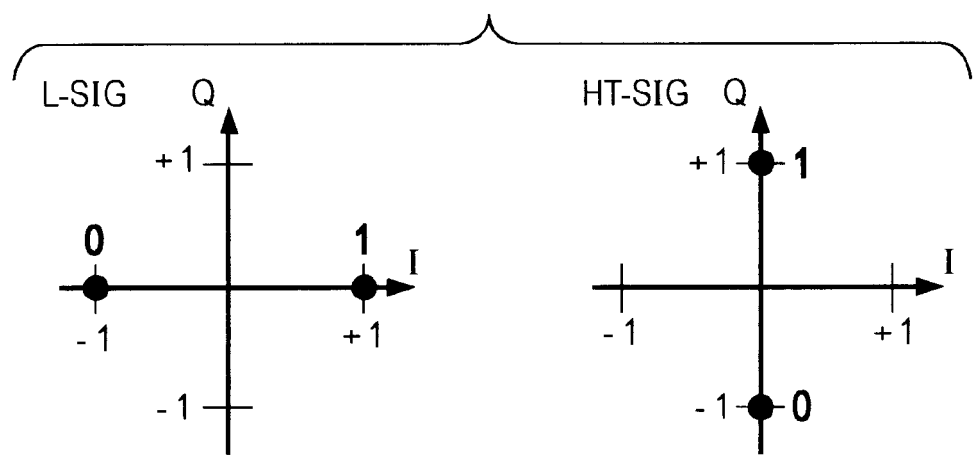
FIG. 7 includes illustrations for describing the scheme of performing binary phase shift keying (BPSK) modulation of the high throughput SIGNAL (HT-SIG) field in a phase space rotated by 90 degrees with respect to the L-SIG field.

In the case of the MM packet shown in FIG. 4, a value differing from the transmission rate defined in the payload of the packet is stored in the RATE field in the L-SIG field as a result of applying the spoofing technique. This causes no problem for the legacy terminal since it is not necessary for the legacy terminal to decode the payload in the MM packet. However, this causes a problem for the HT terminal since it is necessary for the HT terminal to receive the MM packet. To overcome this problem, as shown in FIG. 7, BPSK modulation is applied in a phase space in which the HT-SIG field is rotated by 90 degrees with respect to the L-SIG field. Accordingly, the fact that this packet is an MM packet (in other words, the valued stored in RATE and LENGTH in the L-SIG field have been spoofed) can be recognized. In this case, the HT terminal having received the MM packet can detect the existence of the HT-SIG field by determining whether the phase spaces in the two fields are orthogonal to each other. In the HT-SIG field (not shown), information on the actual method of transmitting the payload (MCS) is stored.

Figure 11:
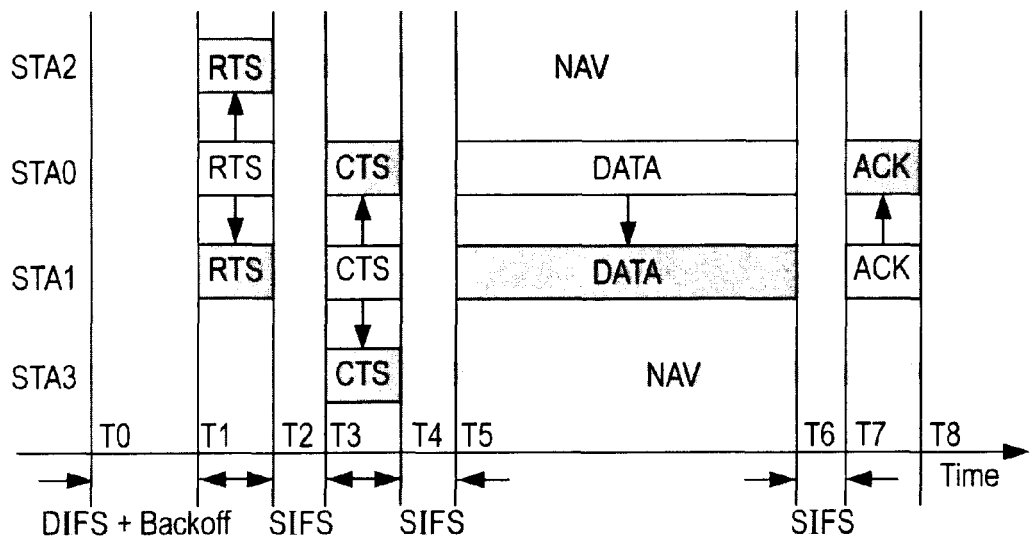
FIG. 11 is an illustration for describing an operation that may happen in peripheral stations in the case where a transmitting station and a receiving station perform an RTS/CTS transmission/reception preparation process.
Figure 12:
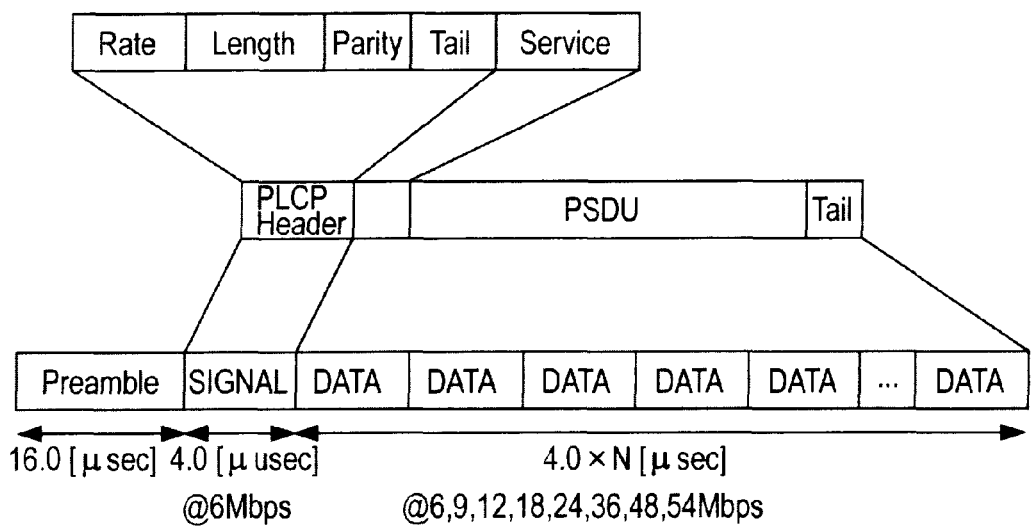
Figure 13:
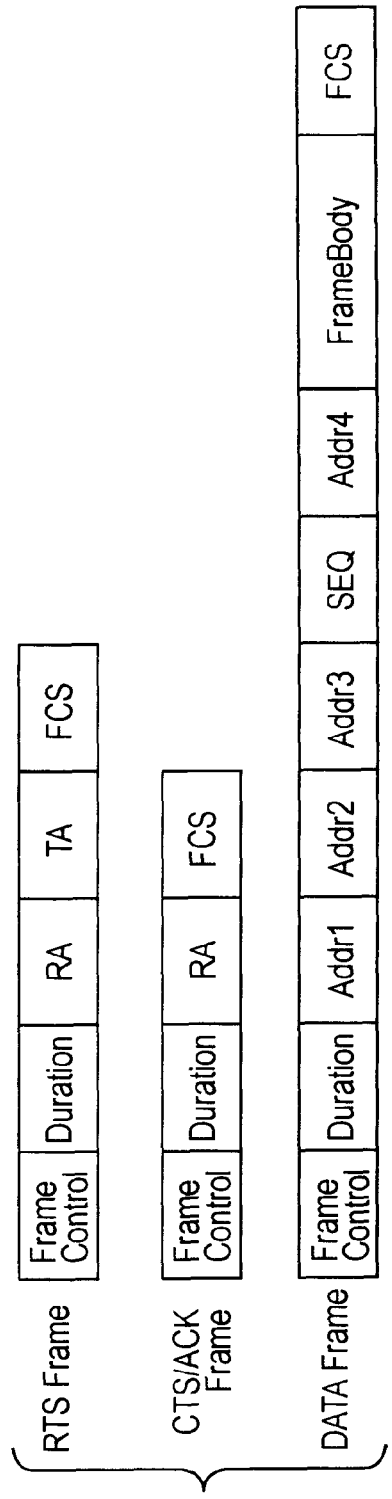
FIG. 13 is an illustration of the payload of each packet type.

In a communication sequence applying the spoofing technique to the RTS/CTS transmission/reception preparation process, even when HT-format packets are used to perform the transmission/reception preparation process and are received by neighboring stations that are legacy terminals, the situation will be the same as that shown in FIG. 11. In this case, if a neighboring station STA2 having received an RTS packet is a legacy terminal, according to L-SIG Duration, this neighboring station STA2 remains to be in the transmission-disabled state until time T8 at which transmission of the ACK packet is completed. However, if the neighboring station STA2 is an HT terminal, according to MAC Duration, the neighboring station STA2 sets a NAV until the same time T8. If the neighboring station STA2 having received a CTS packet is a legacy terminal, according to L-SIG Duration, the neighboring station STA2 remains to be in the transmission-disabled state until time T8 at which transmission of the ACK packet is completed. However, if the neighboring station STA2 is an HT terminal, according to MAC Duration, the neighboring station STA2 sets a NAV until the same time T8.

The HT terminal having received the RTS packet may be disabled from transmitting information on the basis of L-SIG Duration either by performing the PHY layer protocol processing, as in legacy terminals, or by performing the MAC layer protocol processing and setting a NAV (on the basis of a notification from the PHY layer). In the latter case, in order to distinguish a NAV based on L-SIG duration from a NAV based on MAC Duration, a NAV based on L-SIG Duration is referred to as a "first NAV (NAV 1)", and a NAV based on MAC Duration is referred to as a "second NAV (NAV 2)" in the specification. For the convenience of the description, the transmission-disabled state based on L-SIG Duration is referred to as a "first NAV".

As has been described in the related art, if the RTS/CTS transmission/reception preparation process fails, the scheme called "NAV reset" is defined to enable a neighboring station to reset a NAV in order to make the medium free and to improve the throughput of the system. However, it is unfair since, if a neighboring station having received an RTS packet is an HT terminal, the neighboring station can recognize the MAC header; however, if the neighboring station is a legacy terminal, the neighboring station can only recognize L-SIG.

In the exemplary communication sequence shown in FIG. 11, in the case where the neighboring station STA2 having received the RTS packet is an HT terminal, if the neighboring station STA2 receives no data packet within a predetermined time in the Duration period, the neighboring station STA2 resets a NAV using the NAV reset function and can start a transmission operation. In contrast, if the neighboring station STA2 is a legacy terminal, the neighboring station STA2 is in the transmission-disabled state not based on MAC Duration, but by mistaking the end of an ACK packet for the end of a NAV timer. Thus, the neighboring station STA2 is incapable of detecting a failure in the RTS/CTS process and continuously refrains from performing a transmission operation until the spoofed end of the ACK packet (that is, time T8). Compared with the HT terminal, the neighboring station STA2 which is the legacy terminal is significantly disadvantageous.

Figure 8A:
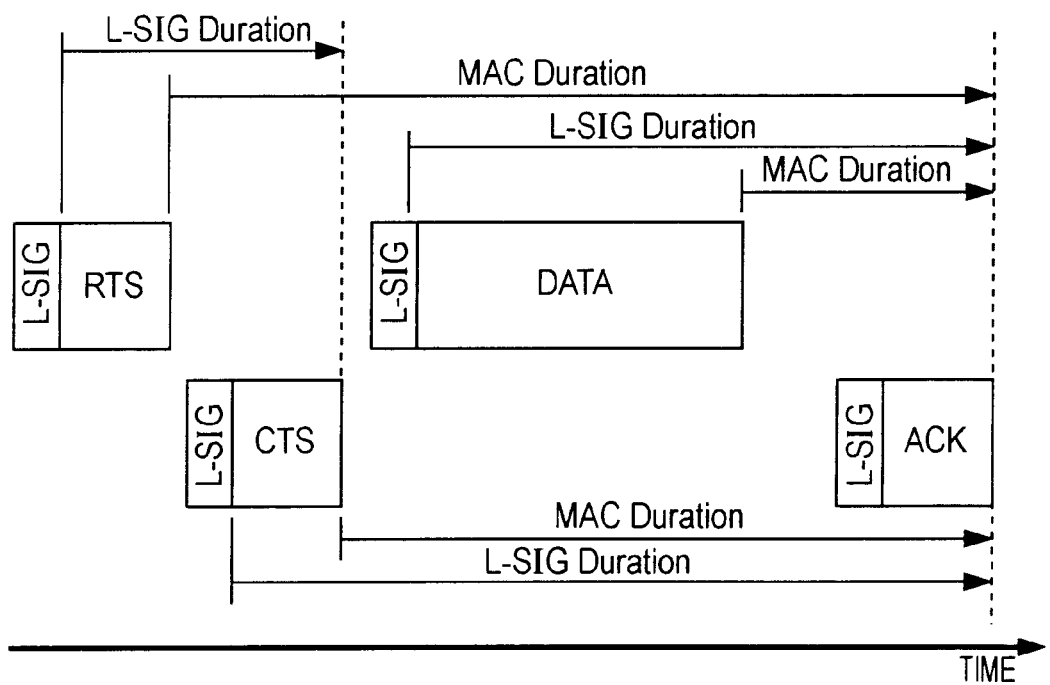
FIG. 8A is an illustration for describing a method of setting L-SIG Duration and MAC Duration for correcting the unfairness between an HT terminal and a legacy terminal.

In order to correct the unfairness between an HT terminal and a legacy terminal, for example, a method of setting L-SIG Duration and MAC Duration as shown in FIG. 8A is conceivable. In the example shown in FIG. 8A, L-SIG Duration in the RTS packet is set not to time T8 at which transmission of the ACK packet is completed, but to time T4 at which transmission of the CTS packet is completed. Therefore, if the neighboring station STA2 is a legacy terminal, the neighboring station STA2 starts physical carrier sensing after time T4. Thus, the neighboring station STA2 which is a legacy terminal can equally obtain a transmission opportunity, even when compared with an HT terminal which estimates the arrival time of a data packet in the period of MAC Duration and resets a NAV. That is, it is possible for the HT terminal having reset the NAV and the legacy terminal in the transmission-disabled state for L-SIG Duration to perform a transmission starting process at the same time.

However, the method of setting L-SIG Duration shown in FIG. 8A has a few problems.

One problem is that, for a neighboring station, the time of a response packet in response to an RTS packet is not uniquely determined.

For example, when a communication terminal serving as a data transmission destination having received an RTS packet wants to send data to a data transmission source in the opposite direction, the data transmission destination may transmit a CTS packet and a data packet in a multiplexed manner. The length of the CTS packet multiplexed with the data packet is not known to a neighboring station having received the RTS packet. In networking based on IEEE 802.11n, it is not known for which value "a predetermined time" at which the NAV Reset function is to be activated should be set. For example, the maximum length of a response packet conceivable in a communication system may be used as the predetermined time. In this case, however, unnecessary overhead is generated.

The MIMO communication system is employed in IEEE 802.11. The HT-LTF field according to the number of transmission antennas is appended to the preamble of a packet. Thus, the packet length of a response packet is indefinite for the neighboring station. For example, the predetermined time at which the NAV reset function is activated may be determined on the basis of the maximum length of a response packet conceivable from the maximum number of antennas allowed for a communication system. However, the transmission source of the response packet may not necessarily have the maximum number of antennas, and unnecessary overhead is generated.

Another problem resides in that the method of setting L-SIG Duration shown in FIG. 8A is not limited to the RTS/CTS transmission/reception preparation process, and is also commonly used in a communication process of exchanging a data packet and an ACK packet using a general random access scheme and the foregoing BAR process. In the communication sequence shown in FIG. 8A, if the RTS/CTS transmission/reception preparation process is performed in the HT format, there is a problem that an HT terminal capable of recognizing even MAC Duration in the MM packet is not allowed to access.

In the case where the RTS/CTS transmission/reception preparation process fails, when a neighboring station having received the RTS packet is a legacy terminal, the neighboring station can start accessing the medium at time T4, which is immediately after the scheduled reception time of the CTS packet according to L-SIG Duration in the RTS packet. In contrast, when the neighboring station is an HT terminal, according to MAC Duration, the neighboring station is incapable of starting accessing the medium until time T8 at which a series of transactions is completed. That is, the HT terminal becomes disadvantageous rather than advantageous.

The inventor of the present invention proposes a method of resetting a NAV in a manner that is fair in both cases where a neighboring station having received an RTS packet is a legacy terminal or an HT terminal.

It is assumed that all communication stations performing the RTS/CTS transmission/reception preparation process are HT terminals and that the method of setting L-SIG Duration and MAC Duration shown in FIG. 8A is employed. That is, in the RTS packet, L-SIG Duration is set to the end of the CTS packet, and MAC Duration is set to the end of the ACK packet. In the CTS packet and the data packet, both L-SIG Duration and MAC Duration are set to the end of the ACK packet.

A legacy terminal serving as a neighboring station is in the transmission-disabled state until the spoofed end of the RTS packet, which can be obtained by LENGTH/RATE, that is, the end of the CTS packet (or the end of the ACK packet), on the basis of a result of recognizing L-SIG Duration from the PHY header of the RTS packet, as has been described above.

After the end of the CTS packet, if there is transmission data, the legacy terminal performs physical carrier sensing for the duration of Distributed Coordination Function (DCF) IFS.

If the RTS/CTS transmission/reception preparation process has been successful, transmission of a data packet begins at the end of the CTS packet at frame intervals SIFS shorter than DIFS. Thus, the legacy terminal senses this and refrains from transmitting data. The legacy terminal recognizes L-SIG Duration from the PHY header of the data packet and again enters the transmission-disabled state until the end of the ACK packet.

If the RTS/CTS transmission/reception preparation process has failed and no CTS packet has been sent, the transmission source of the RTS packet sends no data packet. Thus, the legacy terminal serving as the neighboring station performs physical carrier sensing for DIFS after L-SIG Duration has elapsed, which corresponds to the end of the CTS packet. If no other carrier is detected, the legacy terminal can start a transmission operation.

In contrast, when an HT terminal serving as a neighboring station receives the RTS packet, the HT terminal analyzes the PHY header and sets a NAV 1 on the basis of L-SIG Duration. Thereafter, the HT terminal receives the MAC header of the RTS packet and recognizes MAC Duration. At this point, the HT terminal does not immediately set a NAV 2 on the basis of MAC Duration. Instead, the HT terminal tries to detect a data packet from the transmission source of the RTS packet for a sum period of the NAV 1 and an additional predetermined time α. This predetermined time interval α can be determined on the basis of, for example, SIFS, which is a prescribed time from the end of the CTS packet to the beginning of a data packet.

When a data packet is received within the period of NAV 1+α, it is clear that the RTS/CTS transmission/reception preparation process has been successful. The HT terminal serving as the neighboring station recognizes L-SIG Duration from the PHY header of the data packet, sets a NAV 2 on the basis of MAC Duration of the MAC header, and again enters the transmission-disabled state until the end of the ACK packet.

If the HT terminal has received no data packet within the period of NAV 1+α, it is clear that the RTS/CTS transmission/reception preparation process has failed. The HT terminal serving as the neighboring station performs physical carrier sensing for DIFS after L-SIG Duration has elapsed, which corresponds to the end of the CTS packet. If no other carrier is detected, the HT terminal can start a transmission operation.

Regardless of whether the neighboring station having received the RTS packet is a legacy terminal or an HT terminal, it shall be fully understood that the method of resetting a NAV when the RTS/CTS transmission/reception preparation process fails is fair to both the legacy terminal and the HT terminal.

Figure 8B:
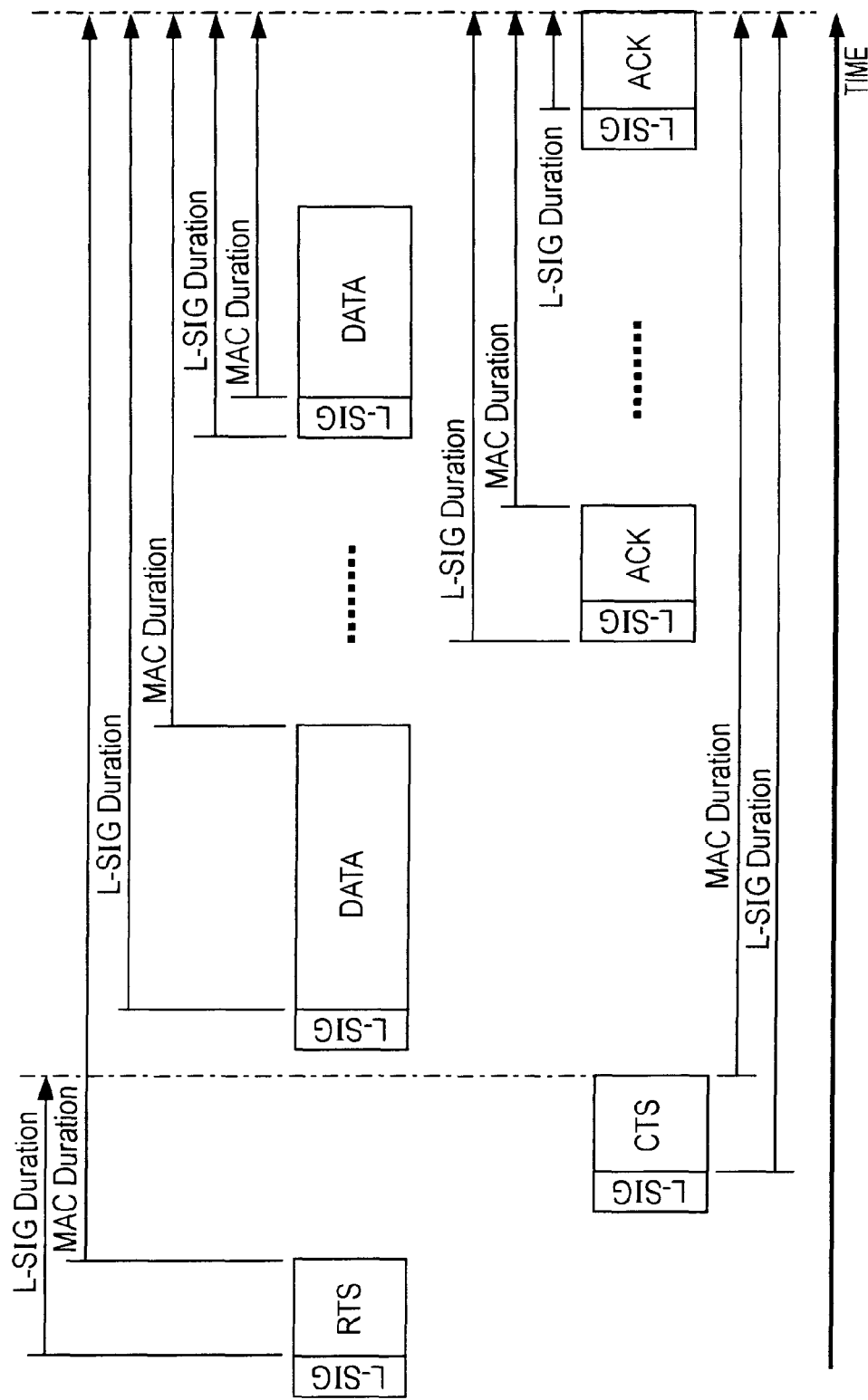
FIG. 8B is an illustration of a modification of an RTS/CTS process shown in FIG. 8A.
Figure 8C:
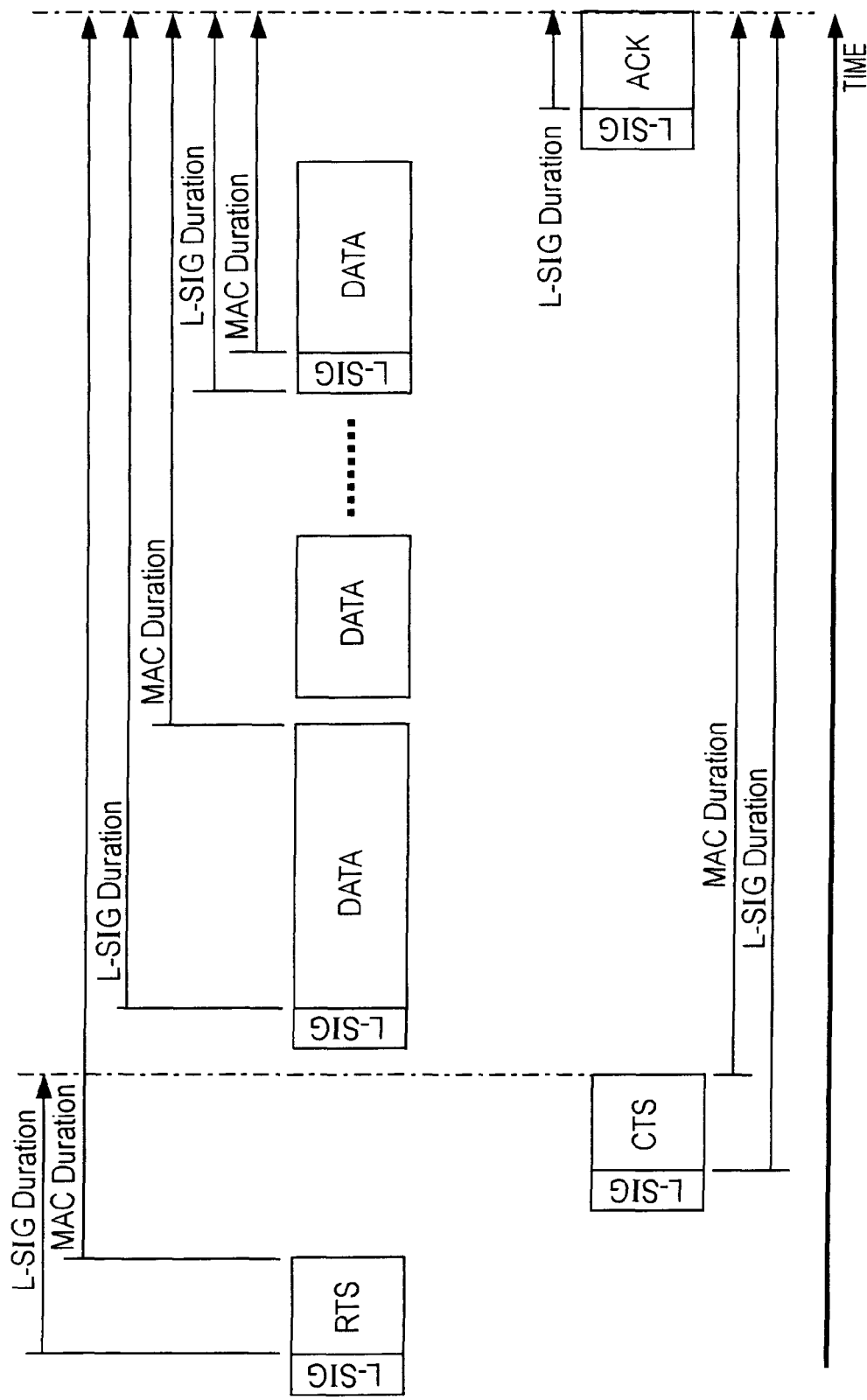
FIG. 8C is an illustration of another modification of the RTS/CTS process shown in FIG. 8A.

FIGS. 8B and 8C illustrate modifications of the RTS/CTS transmission/reception preparation process shown in FIG. 8A. In FIG. 8B, after the sequence of RTS, CTS, data, and ACK, instead of exchanging the RTS and CTS packets again, the sequence of transmitting a data packet and an ACK packet in response to the data packet is repeated. By omitting the sequence of exchanging the RTS and CTS packets again in this manner, there is an advantage that the overhead is reduced.

FIG. 8C illustrates an example of a communication process of sending, after the sequence of RTS, CTS, and data, consecutive data packets and, after the transmission of all the data packets is completed, sending an ACK packet as a response. In this case, as in FIG. 8B, there is an advantage that the overhead can be reduced by omitting the sequence of exchanging the RTS and CTS packets again.

In both the communication sequences in FIGS. 8B and 8C, as in FIG. 8A, in the RTS packet, L-SIG Duration is set to the end of the CTS packet, and MAC Duration is set to the end of the last ACK packet. In the CTS packet and the data packet, both L-SIG Duration and MAC Duration are set to the end of the last ACK packet.

FIG. 9 is a flowchart of a reception process in the case where the wireless communication apparatus 100 operates as a legacy terminal. This process is actually realized by executing, using the central control unit 103, an instruction executing program stored in the information storage unit 108.

When the wireless communication apparatus 100 receives the PLCP preamble, the wireless communication apparatus 100 performs the gain setting of a receiver, synchronization acquisition, frequency offset correction, packet detection, and the like (step S1). Next, the wireless communication apparatus 100 receives the SIGNAL field (L-SIG) of the PHY header (step S2).

The wireless communication apparatus 100 decodes the transmission rate (RATE) and the packet length (LENGTH) described in the SIGNAL field (step S3) and calculates a packet transmission stand-by time determined by dividing the packet length by the transmission rate (packet length/ transmission rate).

Next, the wireless communication apparatus 100 tries to receive the MAC header at the transmission rate specified by RATE in the SIGNAL field (step S4). If the address of a receiving destination is decodable from the MAC header (yes in step S5), the wireless communication apparatus 100 compares the receiving destination address with the local address of the wireless communication apparatus 100 (step S6). If the addresses match each other (yes in step S6), the wireless communication apparatus 100 performs reception processing for the packet length specified by the LENGTH field of the SIGNAL field (step S7).

If the receiving destination address does not match the local address (no in step S6), the wireless communication apparatus 100 sets a NAV for a period corresponding to Duration described in the MAC header (or the wireless communication apparatus 100 enters the transmission-disabled state for a period of L-SIG Duration, which is determined by (packet length/transmission rate)) (step S8).

When the receiving destination address is not decodable from the MAC header (no in step S5), the wireless communication apparatus 100 enters the transmission-disabled state for the period of L-SIG Duration, which is determined by (packet length/transmission rate) on the basis of the description in the SIGNAL field (L-SIG) (step S8).

Figure 10A:
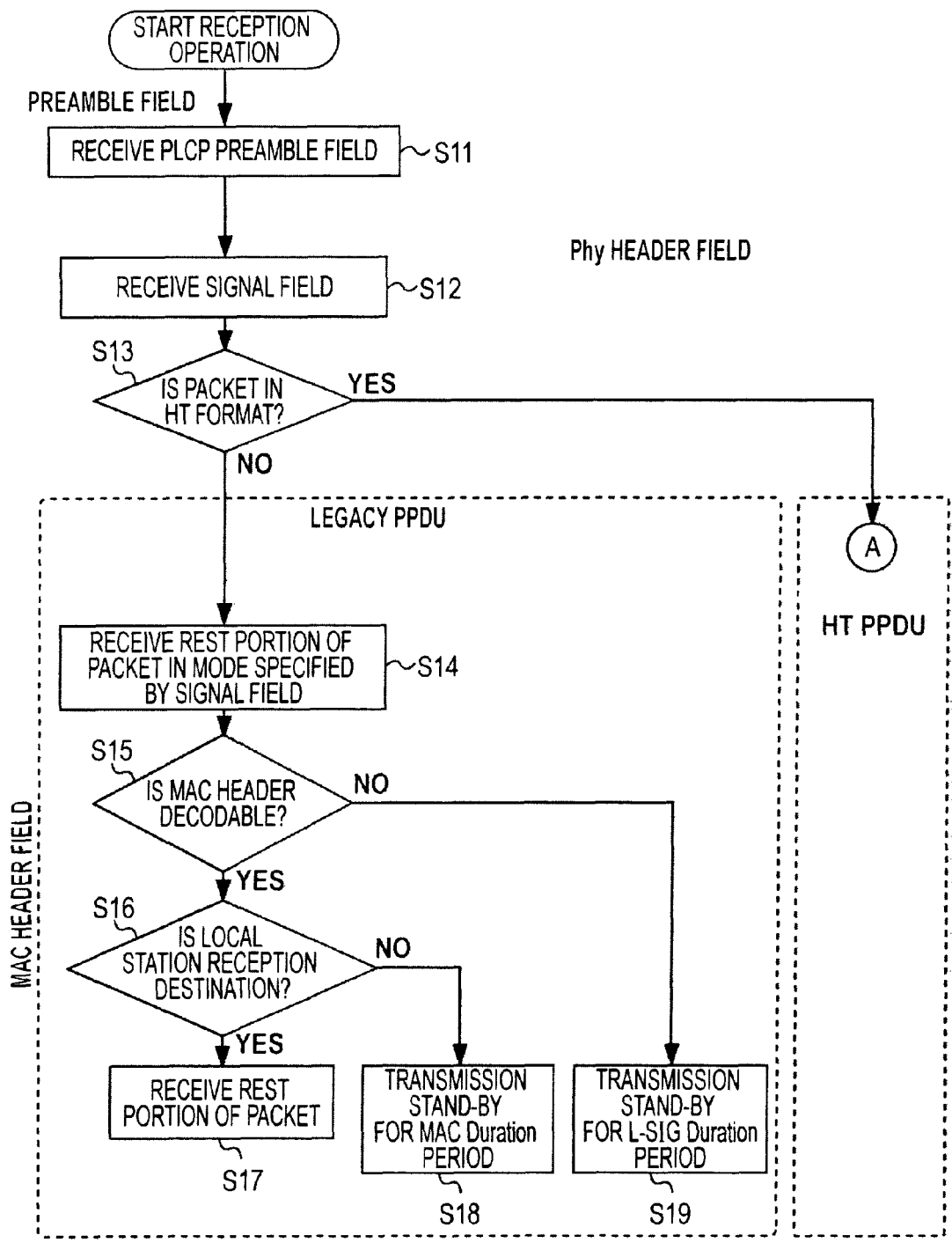
FIG. 10A is a flowchart of a reception process in the case where the wireless communication apparatus operates as an HT terminal.
Figure 10B:
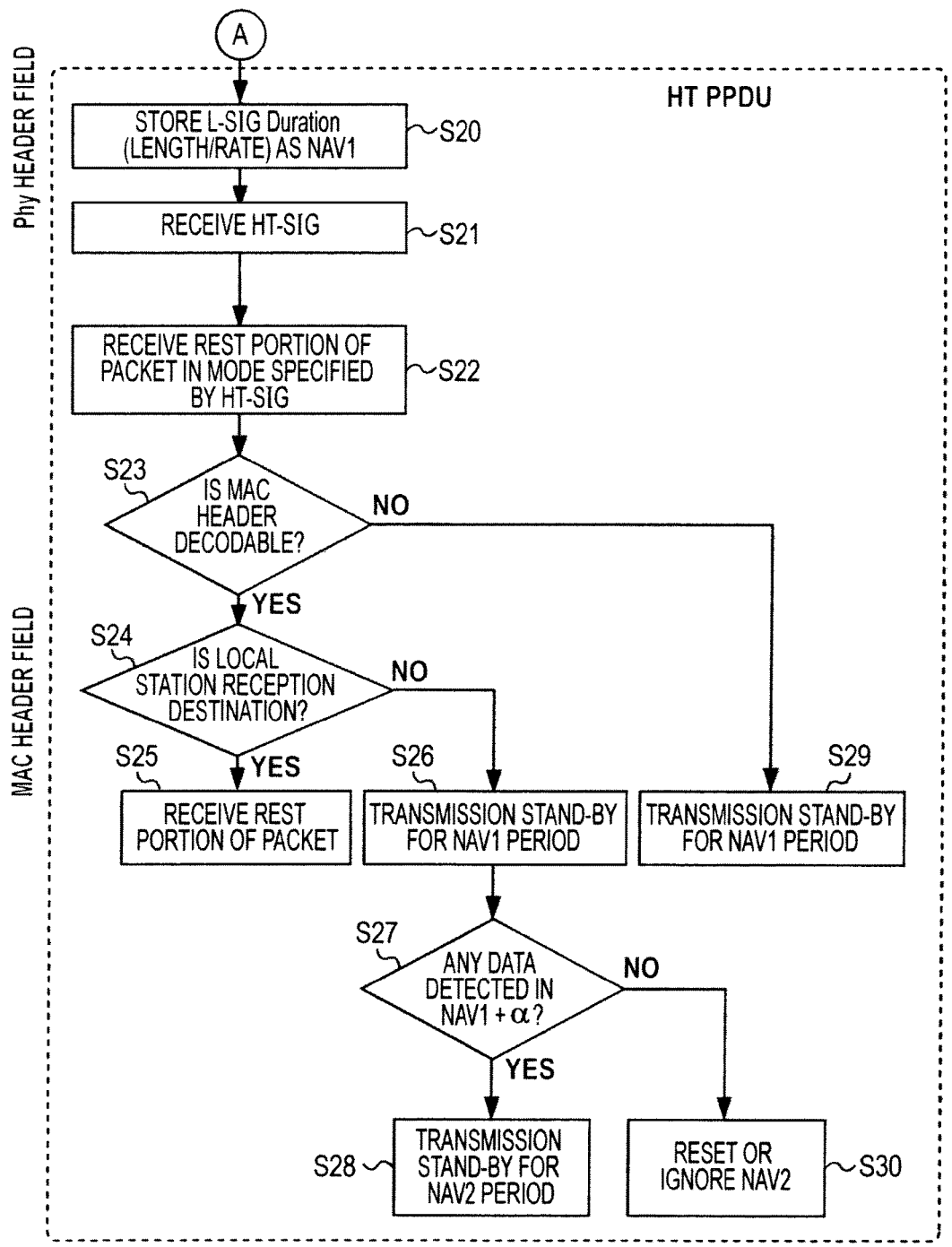
FIG. 10B is a flowchart of the reception process in the case where the wireless communication apparatus operates as the HT terminal.

FIGS. 10A and 10B are flowcharts showing a reception process in the case where the wireless communication apparatus 100 operates as an HT terminal. This process is actually realized by executing, using the central control unit 103, the instruction executing program stored in the information storage unit 108 (the same as described above).

When the wireless communication apparatus 100 receives the PLCP preamble, the wireless communication apparatus 100 performs the gain setting of a receiver, synchronization acquisition, frequency offset correction, packet detection, and the like (step S11). Next, the wireless communication apparatus 100 receives the SIGNAL field (L-SIG) of the PHY header (step S12).

Next, the wireless communication apparatus 100 checks whether the received packet is in the legacy format or the HT format, that is, whether RATE and LENGTH information described in the SIGNAL field have been spoofed (step S13). More specifically, this determination can be made by determining whether received symbols after the SIGNAL field have been BPSK-modulated in a phase space rotated by 90 degrees (see FIG. 7).

If the received packet is in the legacy format (no in step S13), the wireless communication apparatus 100 starts reception processing of the legacy PLCP protocol data unit (PPDU). Initially, the wireless communication apparatus 100 tries to receive a portion after the SIGNAL field of the packet, that is, the MAC portion, at the transmission rate specified by RATE in the SIGNAL field (step S14). The wireless communication apparatus 100 checks whether the MAC header is decodable (step S15).

If the MAC header in the legacy format is not decodable (no in step S15), the wireless communication apparatus 100 gives up the reception processing. The wireless communication apparatus 100 calculates a packet transmission stand-by time determined by dividing the packet length by the transmission rate (packet length/transmission rate) on the basis of the transmission rate (RATE) and the packet length (LENGTH) described in the SIGNAL field and remains to be in the transmission-disabled state for the calculated period (step S19).

If the MAC header is decodable (yes in step S15), the wireless communication apparatus 100 refers to the receiving destination address in the MAC header and checks whether the receiving destination address is the local address (that is, whether the packet is destined to the wireless communication apparatus 100) (step S16). When the receiving destination address matches the local address (yes in step S16), the wireless communication apparatus 100 performs reception processing of the remaining portion of the packet (payload) (step S17). When the receiving destination address does not match the local address (no in step S16), the wireless communication apparatus 100 sets a NAV for the period of Duration specified in the MAC header and enters a transmission stand-by state (step S18).

In contrast, when the received packet is determined to be in the HT format in step S13, the wireless communication apparatus 100 starts reception processing of HT PPDU. The wireless communication apparatus 100 divides the packet length by the transmission rate on the basis of the transmission rate (RATE) and the packet length (LENGTH) information described in L-SIG and temporarily saves the calculated value as a first NAV (NAV 1) (step S20).

Next, the wireless communication apparatus 100 performs reception processing of HT-SIG subsequent to L-SIG (step S21) and obtains information necessary for analyzing the HT format, such as MCS applied to the MAC portion, the data length of the payload, and the like.

Next, the wireless communication apparatus 100 tries to receive the MAC portion according to the transmission method revealed from HT-SIG (step S22) and checks whether the MAC header is decodable (step S23).

If the MAC header in the HT format is not decodable (no in step S23), the wireless communication apparatus 100 gives up the reception processing. The wireless communication apparatus 100 sets a NAV for the period of NAV 1, which is temporarily stored in step S20, and enters a transmission stand-by state (step S29).

If the MAC header is decodable (yes in step S23), the wireless communication apparatus 100 refers to the receiving destination address in the MAC header and checks whether the receiving destination address is the local address (that is, whether the packet is destined to the wireless communication apparatus 100) (step S24). When the receiving destination address matches the local address (yes in step S24), the wireless communication apparatus 100 performs reception processing of the remaining portion of the packet (payload) (step S25).

When the receiving destination address does not match the local address (no in step S24), the wireless communication apparatus 100 sets a NAV for the period of NAV 1, which is temporarily stored in step S20, and enters a transmission stand-by state (step S26). In parallel to the reception operation, the wireless communication apparatus 100 monitors the arrival of a subsequent data packet sent from the transmission source of the received packet for a sum period of NAV 1 and a predetermined time α (step S27).

When a subsequent data packet is received within the sum period of NAV 1 and the predetermined period α (yes in step S27), it can be estimated that the data packet transmission/ reception preparation process has been successful. The wireless communication apparatus 100 sets a NAV for a period of NAV 2, which is stored in the Duration field of the MAC header, and enters a transmission stand-by state (step S28).

When no subsequent data packet is received within the sum period of NAV 1 and the predetermined period α (no in step S27), it can be estimated that the data packet transmission/reception preparation process has failed.

More specifically, this failure of the transmission/reception preparation process corresponds to the following cases. That is, the cases include when no CTS packet sent from the data transmission destination reaches the data transmission source in the RTS/CTS transmission/reception preparation process, when no ACK packet in response to a data packet reaches the data transmission source in the case where small data and ACK packets replace the transmission/reception preparation process, or when no Block ACK packet reaches the data transmission source in a Block ACK Request/Block ACK process.

In such cases, the HT terminal activates the NAV reset function so that the HT terminal can start a transmission operation (step S30). More specifically, the HT terminal resets the NAV 2 decoded from the MAC header or, even when the period of NAV 1 has elapsed and the virtual carrier sensing state has been released, ignores the NAV 2 and does not set the next NAV.

It thus shall be fully understood that, regardless of whether a neighboring station having received the RTS packet is a legacy terminal or an HT terminal, the NAV resetting process performed when the RTS/CTS transmission/reception preparation process has failed is fair to the legacy terminal and the HT terminal.

INDUSTRIAL APPLICATION

It should be understood by those skilled in the art that various modifications, combinations, sub-combinations, and alterations may occur depending on design requirements and other factors insofar as they are within the scope of the appended claims or the equivalents thereof.

The invention claimed is:

1. A wireless communication system comprising communication stations in which transmission of data packets begins after a predetermined block acknowledgment request/block acknowledgement transmission/reception preparation process is performed between a communication station serving as a data transmission source and a communication station serving as a data transmission destination, wherein:
   the communication station serving as the data transmission source stores, in a header of a block acknowledgement request packet, first duration information and second duration information, wherein the first duration information corresponds to a scheduled end of a block acknowledgment packet sent from the communication station serving as the data transmission destination during the transmission/reception preparation process in response to the block acknowledgement request packet sent from the communication station serving as the data transmission source, wherein the second duration information corresponds to a scheduled end of an acknowledgement packet sent from the communication station serving as the data transmission destination in response to a data packet sent from the communication station serving as the data transmission source after the transmission/reception preparation process, and
   a neighboring station having received the block acknowledgement request packet including the first duration information and the second duration information sent from the communication station serving as the data transmission source sets a first network allocation vector and a second network allocation vector, wherein the first network allocation vector relates to a scheduled reception completion time of the block acknowledgement packet on the basis of the first duration information, wherein the second network allocation vector relates to a scheduled reception completion time of the acknowledgement packet on the basis of the second duration information, and
   wherein the neighboring station ignores the second network allocation vector when no packet transmission is detected within a period for which the first network allocation vector has been set or within a predetermined time after the scheduled reception completion time of the block acknowledgement packet.

2. A wireless communication system comprising communication stations in which transmission of data packets begins after a predetermined block acknowledgement request/block acknowledgement transmission/reception preparation process is performed between a communication station serving as a data transmission source and a communication station serving as a data transmission destination, wherein:
   the communication station serving as the data transmission source stores, in a header of a block acknowledgement request packet, first duration information and second duration information, wherein the first duration information corresponds to a scheduled end of a block acknowledgement packet sent from the communication station serving as the data transmission destination during the transmission/reception preparation process in response to the block acknowledgement request packet sent from the communication station serving as the data transmission source, wherein the second duration information corresponds to a scheduled end of an acknowledgment packet sent from the communication station serving as the data transmission destination in response to a data packet sent from the communication station serving as the data transmission source after the transmission/reception preparation process, and
   a neighboring station having received the block acknowledgement request packet sent from the communication station serving as the data transmission source sets a first network allocation vector and a second network allocation vector, wherein the first network allocation vector relates to a scheduled reception completion time of the block acknowledgement packet on the basis of the first duration information, wherein in response to detection of packet transmission within a predetermined time after the scheduled reception completion time of the block acknowledgement request packet, an another communication station sets the second network allocation vector relating to a scheduled reception completion time of the acknowledgement packet on the basis of the second duration information, and
   wherein the another communication station ignores the second network allocation vector when no packet transmission is detected within a period for which the first network allocation vector has been set.

3. A wireless communication apparatus operating in a wireless network in which transmission of data packets begins after a block acknowledgment request/block acknowledgment transmission/reception preparation process is performed between a communication station serving as a data transmission source and a communication station serving as the data transmission destination, wherein at least two types of duration information are stored in a header of a block acknowledgment request packet sent from the communication station serving as the data transmission source for the transmission/reception preparation process, the apparatus comprising:

means for sending packets;
means for receiving packets; and
communication control means for controlling transmission/reception of packets, wherein in a case where the communication station serving as the data transmission source stores, in the header of the block acknowledgment request packet, first duration information and second duration information, wherein the first duration information corresponds to a scheduled end of a block acknowledgement packet is sent from the communication station serving as the data transmission destination during the transmission/reception preparation process in response to the block acknowledgement request packet, and wherein the second duration information corresponding to a scheduled end of an acknowledgement packet sent from the communication station serving as the data transmission destination in response to a data packet sent from the communication station serving as the data transmission source after the transmission/reception preparation process, upon receipt of the block acknowledgment request packet sent from the communication station serving as a data transmission source to another communication station serving as an unintended data transmission destination, the communication control means sets a first network allocation vector and a second network allocation vector, wherein the first network allocation vector relates to a scheduled reception completion time of the block acknowledgement packet on the basis of the first duration information, wherein the second network allocation vector relates to a scheduled reception completion time of the acknowledgement packet on the basis of the second duration information, and wherein the another communication station ignores the second network allocation vector when in a case where no packet transmission is detected within a predetermined time after the scheduled reception completion time of the block acknowledgment request packet.

4. A wireless communication apparatus operating in a wireless network in which transmission of data packets begins after a block acknowledgement request/block acknowledgment transmission/reception preparation process is performed between a communication station serving as a data transmission source and a communication station serving as a data transmission destination, wherein at least two types of duration information are stored in a header of a block acknowledgment request packet sent from the communication station serving as the data transmission source for the transmission/reception preparation process, the apparatus comprising:

means for sending packets;
means for receiving packets; and
communication control means for controlling transmission/reception of packets, wherein, in a case where the communication station serving as the data transmission source stores, in the header of the block acknowledgment request packet, first duration information and second duration information, wherein the first duration information corresponds to a scheduled end of block acknowledgment packet, wherein the block acknowledgment packet is sent from the communication station serving as the data transmission destination during the transmission/preparation process in response to the block acknowledgement request packet, wherein the second duration information corresponding to a scheduled end of an acknowledgement packet sent from the communication station serving as the data transmission destination in response to a data packet sent from the communication station serving as the data transmission source after the transmission/reception preparation process, upon receipt of the block acknowledgment request packet sent from the communication station serving as the data transmission source to another communication station serving as an unintended data transmission destination, the communication control means sets a first network allocation vector and a second network allocation vector, wherein the first network allocation vector relates to a scheduled reception completion time of the block acknowledgment packet on the basis of the first duration information, wherein the second network allocation vector relates to a schedule reception completion time of the acknowledgement packet on the basis of the second duration information, wherein in response to detection of packet transmission with a predetermined time after the scheduled reception completion time of the block acknowledgement packet, an another communication station sets the second network allocation vector relating to a scheduled reception completion time of the acknowledgement packet on the basis of the second duration information, and wherein another communication station ignores the second network allocation vector when no packet transmission is detected within a period for which the first network allocation vector has been set.

5. A wireless communication apparatus comprising:
circuitry configured to receive a request packet from a first wireless communication device, the request packet including first duration information and second duration information, wherein the first duration information is included in a legacy signaling (L-SIG) portion and the second duration information is included in a duration field of a media access control (MAC) header,
set a network allocation vector (NAV) based on the second duration information, detect a response packet, from a second wireless communication device, responding to the request packet, and
reset the NAV, when the wireless communication apparatus does not detect the response packet during a time after an expiration of a first duration indicated by the first duration information but before an expiration of a second duration indicated by the second duration information.

* * * * *